(12) United States Patent
Long

(10) Patent No.: US 12,017,764 B2
(45) Date of Patent: Jun. 25, 2024

(54) VTOL AIRCRAFT FAN TILTING MECHANISMS AND ARRANGEMENTS

(71) Applicant: Wisk Aero LLC, Mountain View, CA (US)

(72) Inventor: Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 98 days.

(21) Appl. No.: 17/512,433

(22) Filed: Oct. 27, 2021

(65) Prior Publication Data

US 2022/0126996 A1 Apr. 28, 2022

Related U.S. Application Data

(60) Provisional application No. 63/106,197, filed on Oct. 27, 2020.

(51) Int. Cl.
*B64C 29/00* (2006.01)
*B60L 3/00* (2019.01)
(Continued)

(52) U.S. Cl.
CPC ........ *B64C 29/0033* (2013.01); *B60L 3/0092* (2013.01); *B60L 50/60* (2019.02);
(Continued)

(58) Field of Classification Search
CPC .................................................. B64C 29/0033
See application file for complete search history.

(56) References Cited

U.S. PATENT DOCUMENTS 2,702,168 A * 2/1955 Platt .................... B64C 29/0033
244/7 R
5,195,702 A 3/1993 Malvestuto, Jr.
(Continued)

FOREIGN PATENT DOCUMENTS

CN 111452981 A 7/2020
EP 3647193 A1 5/2020
(Continued)

OTHER PUBLICATIONS

PCT/US2021/056667, "International Search Report and Written Opinion", dated Jan. 28, 2022, 10 pages.
(Continued)

*Primary Examiner* — Tien Q Dinh
*Assistant Examiner* — William L Gmoser
(74) *Attorney, Agent, or Firm* — Kilpatrick Townsend & Stockton LLP

(57) ABSTRACT

Disclosed is an electric aircraft, which includes a fuselage and at least one wing coupled to the fuselage. The electric aircraft includes a plurality of tilting fans coupled to the at least one wing, the plurality of tilting fans being configured to move between a vertical lift position and a forward flight position. The electric aircraft includes a plurality of tilting mechanisms coupled with at least one tilting fan. The electric aircraft includes a first actuator coupled to a first subset of the plurality of tilting mechanisms. The first subset of tilting mechanisms are identified among the plurality of tilting mechanisms according to a coupling scheme. The first actuator tilts a first group of tilting fans coupled to the first subset of the plurality of tilting mechanisms simultaneously.

21 Claims, 17 Drawing Sheets

(51) Int. Cl.
  *B60L 50/60* (2019.01)
  *B64D 27/24* (2006.01)
  *H02J 1/14* (2006.01)
  *H02J 4/00* (2006.01)
  *H02P 4/00* (2006.01)

(52) U.S. Cl.
  CPC ............... *B64D 27/24* (2013.01); *H02J 1/14* (2013.01); *H02J 4/00* (2013.01); *H02P 4/00* (2013.01); *B60L 2200/10* (2013.01); *H02J 2310/44* (2020.01)

(56) References Cited

U.S. PATENT DOCUMENTS

| | | | |
|---|---|---|---|
| 6,247,667 B1 * | 6/2001 | Fenny | B64C 29/0033 244/7 R |
| 6,415,242 B1 | 7/2002 | Weldon, Jr. et al. | |
| 10,589,838 B1 * | 3/2020 | Suppes | B64D 35/04 |
| 2004/0042145 A1 | 3/2004 | Garnett | |
| 2008/0197961 A1 | 8/2008 | Patel | |
| 2012/0234968 A1 * | 9/2012 | Smith | B64C 29/0033 244/12.3 |
| 2016/0083075 A1 * | 3/2016 | Moxon | B64C 3/52 244/13 |
| 2018/0312248 A1 | 11/2018 | Leng | |
| 2020/0140079 A1 | 5/2020 | Campbell | |
| 2020/0156780 A1 | 5/2020 | Varigas | |
| 2020/0164975 A1 | 5/2020 | Robertson et al. | |
| 2021/0206487 A1 * | 7/2021 | Iqbal | B64C 29/0083 |
| 2021/0300527 A1 * | 9/2021 | Thalheimer | B64C 29/0025 |
| 2022/0009625 A1 | 1/2022 | Bower et al. | |
| 2022/0024572 A1 * | 1/2022 | Vanni | B64C 27/006 |

FOREIGN PATENT DOCUMENTS

| | | |
|---|---|---|
| JP | 2002153027 A | 5/2002 |
| JP | 2010220465 A | 9/2010 |
| JP | 2018537348 A | 12/2018 |
| KR | 20230093315 A | 6/2023 |
| WO | 2018203036 A1 | 11/2018 |

OTHER PUBLICATIONS

PCT/US2021/056891, "International Search Report and Written Opinion", dated Feb. 1, 2022, 9 pages.
PCT/US2021/056667, "International Preliminary Report on Patentability", dated May 11, 2023, 9 pages.
PCT/US2021/056891, "International Preliminary Report on Patentability", dated May 11, 2023, 8 pages.
U.S. Appl. No. 17/202,855, "Non-Final Office Action", dated Aug. 25, 2023, 8 pages.

* cited by examiner

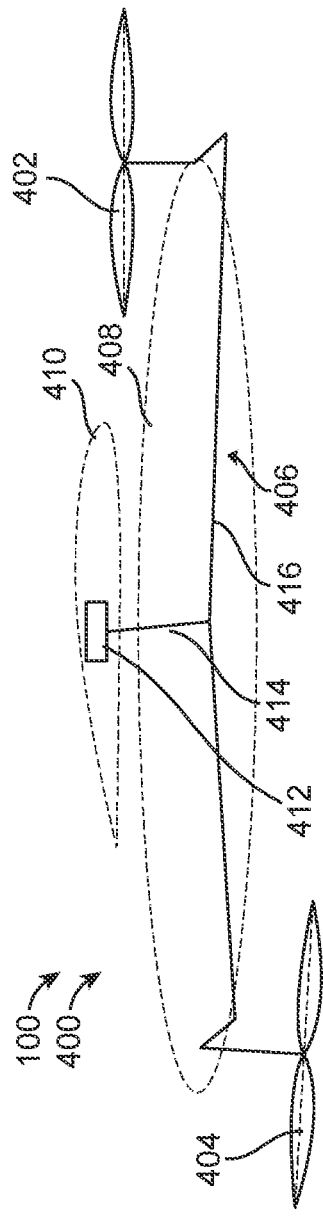
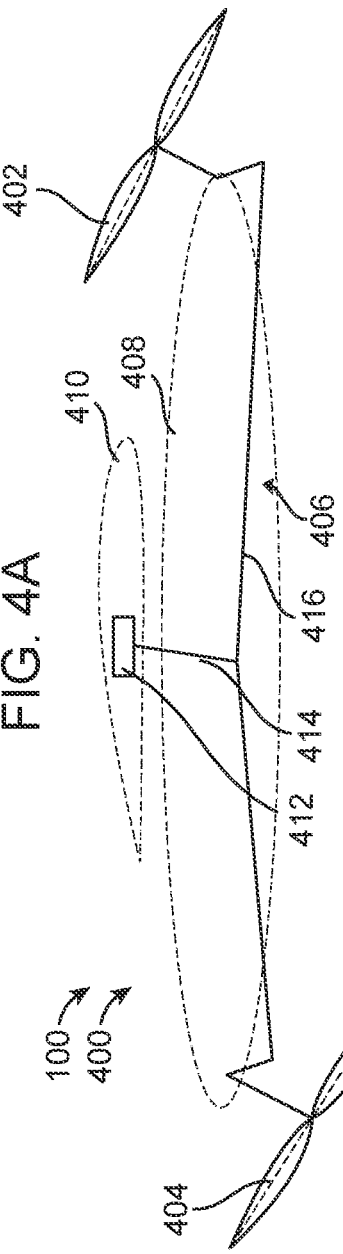
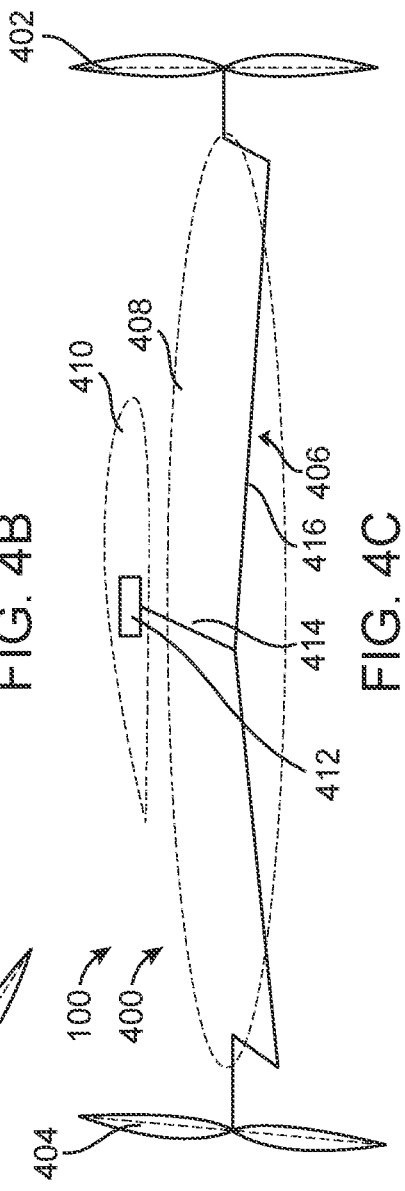
FIG. 4A
FIG. 4B
FIG. 4C

VTOL AIRCRAFT FAN TILTING MECHANISMS AND ARRANGEMENTS

CROSS-REFERENCES TO RELATED APPLICATIONS

This application claims benefit under 35 USC § 119(e) to U.S. Provisional Patent Application No. 63/106,197 filed Oct. 27, 2020 and entitled "VTOL AIRCRAFT FAN TILTING MECHANISMS AND ARRANGEMENTS," the disclosure of which is incorporated by reference herein in its entirety for all purposes.

BACKGROUND

A Vertical takeoff and landing (VTOL) aircraft generally can produce vertical thrust, allowing for vertical, or primarily vertical, movement directions. Such vertical takeoff, landing, and hovering functionality may allow for an aircraft to land and takeoff without the space limitations of a runway or other space to allow for traditional horizontal landing (such as an airplane). To provide this functionality, a VTOL fan may have vertical movement mechanisms, such as fans, which provide for vertical thrust.

However, it is generally desirable for VTOL aircraft to additionally be capable of horizontal thrust, and thus transition to horizontal movement when the aircraft is not taking off, landing, or hovering, such that the VTOL aircraft can "cruise" in the air. As such, a VTOL aircraft may have separate movement mechanisms dedicated to provide for vertical and horizontal thrust, respectively. A VTOL aircraft may have movement mechanisms that provide for both thrust directions.

In aircraft design generally, a major factor of the capabilities of the craft depend on limiting the weight of the aircraft. Limiting the number of components, and their associated weight, may allow for more energy-efficient flights, larger payloads, or a combination of both desired outcomes.

While limiting weight with less components is desirable, as discussed, this design configuration is tempered by the inherent safety risks of air travel. In particular, limiting the number of components in a power system may provide weight advantages to the design, but may additionally limit the redundant features of the power system, creating higher-risk of single fault failure and resulting in accidents from an aircraft failing during flight.

In general, it would be advantageous to provide for improved aircraft designs which allow for weight and cost savings, while providing beneficial safety and redundant design features to maintain a safe and reliable aircraft.

BRIEF SUMMARY

The described embodiments relate generally to an aircraft with vertical takeoff and landing capability. In particular, the embodiments provide an aircraft with one or more tilting fans which provide vertical and horizontal thrust in a controlled fashion for hover, transition and cruise (horizontal) flight.

Embodiments generally provide improved devices, systems, and methods for an aircraft with a plurality of tilting fans. More specifically, techniques disclosed herein provide a VTOL aircraft (e.g. an electric VTOL aircraft) with a plurality of tilting fans that can tilt between a horizontal position for vertical lift movement and a vertical position for forward flight movement. Various structures and configurations are provided which may allow for actuation and control of the various tilting fans which may further the means of design efficiency, reduced cost and safety, and improved flight comfort and performance, for example.

In some embodiments, the VTOL aircraft (hereinafter "aircraft") may be powered by various power units. For example, in various embodiments, the aircraft may have at least one power source providing energy to various components of the aircraft. For example, the aircraft may be electrically powered, such as with one or more batteries. An electrical power mechanism may provide electrical power to one or more motors, actuators, or other powered aspects of the aircraft.

According to various embodiments, the aircraft may include a fuselage. The fuselage may make up the central body of the aircraft. In various embodiments, the fuselage may provide for various layouts, such to provide for a cockpit, a passenger compartment, and/or a storage area. As such, the fuselage may have one or more bulkheads which divide various sections of the fuselage. The fuselage may further comprise one or more doors to allow access to the interior of the fuselage. For example, the fuselage may have one or more above-head doors, side doors, front doors, or rear doors. Various door configurations which allow for convenient access to the fuselage of the aircraft are contemplated.

In some embodiments, the aircraft may include at least one wing which attached to the fuselage. For example, the aircraft may have a left wing and a right wing coupled to each respective side of the fuselage. In various embodiments, the aircraft may have one or more wings that span the entire width of the aircraft, such as spanning across the fuselage and coupling with the top or bottom of the fuselage. Various wing structures are contemplated which provide the desired aerodynamic advantages and/or a wing structure which allows for convenient entry and exit of the aircraft.

According to various embodiments, the aircraft may include one or more support elements (e.g. booms) which may couple to the top or bottom of the wing. In various embodiments, the one or more support elements may have a generally tubular structure, and may span crosswise from the at least one wing. For example, the support elements may span towards the front and rear of the aircraft, to distribute or space apart various fans (or other mechanisms providing thrust), such as for balance and distributing thrust of the aircraft. In various embodiments, fans may be attached to the support elements at opposite ends, such that a front fan may be positioned at the leading edge of the wing(s), and an aft fan may be positioned at the trailing edge of the wing(s). In various embodiments, the support elements may be hollow and thus may house various elements of the aircraft, and specifically may house elements of the control system of the aircraft.

In some embodiments, the aircraft may include a plurality of fans. The plurality of fans may include stationary fans, such that the stationary fans provide thrust in a single direction. The plurality of fans may include tilting fans, where the tilting fans can rotate or pivot to provide thrust in a variety of directions. For example, the tilting fans may be moveable between a vertical lift position and a forward flight position. Further, the tilting fans may be capable of providing thrust in various directions between the vertical lift position and the forward flight position, which may allow for partially-vertical flight, partially-horizontal flight, or may provide steering functionalities for the aircraft. According to various embodiments, the tilting fans and stationary fans may include a variable pitch mechanism, to provide for adjustment of the pitch of the blades of each of the fans depending on direction of flight and speed. The variable pitch mechanism may include an actuator that twists the blades about the blade axis.

In some embodiments, the aircraft may include a plurality of tilting mechanisms, which may couple with at least one tilting fan. The plurality of tilting mechanisms may act to rotate or pivot the plurality of fans between the vertical lift position and the horizontal flight position. The plurality of tilting mechanisms may include a variety of structures and components to provide this function, including, for example, motors, hydraulic pistons (having hydraulic lines), and/or coupling mechanisms (e.g. coupling arms). The plurality of tilting mechanisms may be provided within a given support element.

According to various embodiments, the aircraft may include an actuator (or multiple actuators). The actuator may couple to one or more of the plurality of tilting mechanisms, for example via control arms (and/or a drive shaft) or via hydraulic lines. For example, the actuator may act to actuate one or more of the plurality of tilting mechanisms. According to various embodiments, the actuator(s) described herein, which may drive the motion of the tilting mechanisms may include, among other components, a rotary electric motor (with or without a gearbox), a linear direct drive electric motor, a ball screw actuator (e.g. a rotary electric motor with ball screw transmission to get linear motion), a compressor, a hydraulic piston, or a pneumatic piston.

In some embodiments, the control system of the aircraft may be designed according to a coupling scheme. The coupling scheme may provide the specific configuration of which of the plurality of the tilting fans are connected relative to one another, and by which means. Various examples are provided herein of embodiments of controlling the tilting aspect of the tilting fans, such that various tilting fans may be coupled, for example by tilting mechanisms, such that a given number of the plurality of tilting fans operably tilt in coordination with one another.

BRIEF DESCRIPTION OF THE DRAWINGS

Various embodiments are disclosed in the following detailed description and the accompanying drawings.

FIGS. 4A-4C illustrates an exemplary control system of the VTOL aircraft, for providing pivoting or tilting of a plurality of tilting fans, according to various embodiments.

FIGS. 8-1A through 8-1C illustrate the control system of FIGS. 8A-8C including a drive shaft provided in the wing, according to various embodiments.

DETAILED DESCRIPTION

Techniques disclosed herein relate generally to an aircraft with a plurality of tilting fans (e.g. propellers). More specifically, techniques disclosed herein provide a VTOL aircraft with a plurality of tilting fans that can tilt between a horizontal position for vertical lift movement and a vertical position for forward flight movement. Various inventive embodiments are described herein, including methods, processes, systems, devices, and the like.

In order to better appreciate the features and aspects of control systems and powering configurations for aircrafts according to the present disclosure, further context for the disclosure is provided in the following section by discussing particular embodiments of a VTOL aircraft according to embodiments of the present disclosure. These embodiments are for example only and other configurations can be employed in connection with the VTOL aircraft described herein.

Figure 1A:
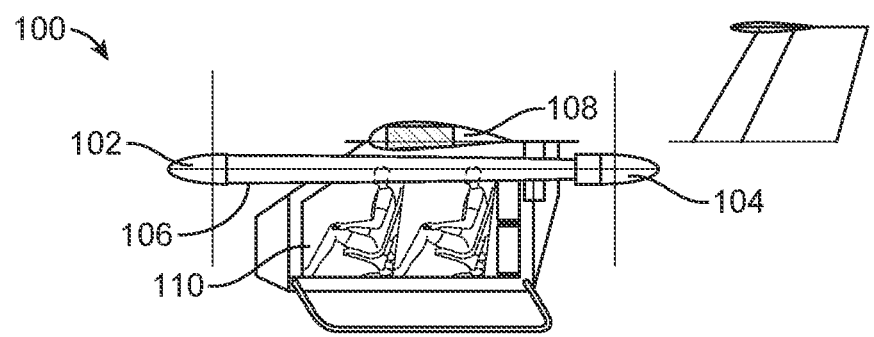
FIG. 1A illustrates a simplified schematic of an exemplary VTOL aircraft including tilting fans in a forward flight position, according to various embodiments.
Figure 1B:
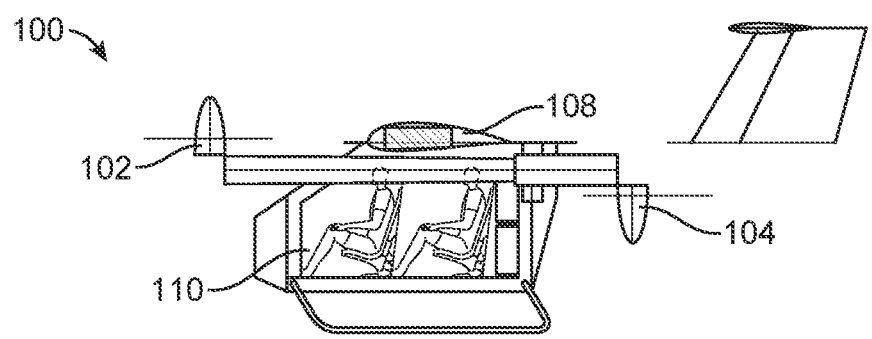
FIG. 1B illustrates a simplified schematic of an exemplary VTOL aircraft including tilting fans in an exemplary vertical lift position, according to various embodiments.

FIGS. 1A-1B show a simplified schematic of an exemplary VTOL aircraft 100. FIG. 1A shows an exemplary VTOL aircraft with tilting fans 102, 104 in a forward flight position. FIG. 1B depicts an exemplary VTOL aircraft 100 with tilting fans 102, 104 in a vertical flight position. According to various embodiments, the VTOL aircraft 100 may be an electrically powered aircraft (e.g. an electric aircraft). In some embodiments, the VTOL aircraft 100 may be configured to carry one or more passengers and/or cargo, and may be controlled automatically and/or remotely (e.g. may not require an on-board pilot to operate the aircraft). In the example shown, the VTOL aircraft 100 includes a fuselage 110 which may include a cabin section for carrying passengers and/or cargo.

The VTOL aircraft 100 may include at least one wing 108 which attached to the fuselage 110. For example, the aircraft may have a left wing and a right wing coupled to each respective side of the fuselage 110. In various embodiments, the VTOL aircraft 100 may have one or more wings that span the entire width of the VTOL aircraft 100, such as spanning across the fuselage 110 and coupling with the top or bottom of the fuselage 110.

One or more support elements 106 (or "booms") may be coupled to the wing 108 of the VTOL aircraft 100. For example, the wing 108 may include a left wing and a right wing. Each one of the left wing and the right wing may include three support elements 106. For example, the support elements 106 may be an elongated shape spanning perpendicularly from the wing 108, having a front portion and an aft portion.

In various embodiments, the VTOL aircraft 100 may include a plurality of tilting fans 102, 104. For example, the VTOL aircraft may have a front tilting fan 102 and an aft tilting fan 104. In various embodiments, the plurality of tilting fans 102, 104 may be coupled with the one or more wing 108, and/or may couple with the one or more support elements 106. For example, the support elements may each including a pair of tilting fans 102, 104 mounted thereon. The tilting fans 102, 104 of the VTOL aircraft 100 may comprise a propulsion motor, which powers fans of the tilting fans 102, 104. The tilting aspect of the tilting fans may allow for the tilting fans to provide thrust from the propulsion motor in a variety of directions, allowing for propulsion in both vertical and horizontal direction, as well as variable pitch such as for steering and control of the VTOL aircraft 100.

The VTOL aircraft 100 may also include a combination of tilting fans 102, 104 and stationary fans, such that the stationary fans provide thrust in a single direction (such as only vertically or horizontally). According to various embodiments, the tilting fans and stationary fans may include a variable pitch mechanism, to provide for adjustment of the pitch of the blades of each of the fans depending on direction of flight and speed. The variable pitch mechanism may include an actuator that twists the blades about the blade axis. The tilting mechanisms may be coupled to the pitch of the blades of the tilting fans.

Figure 2A:
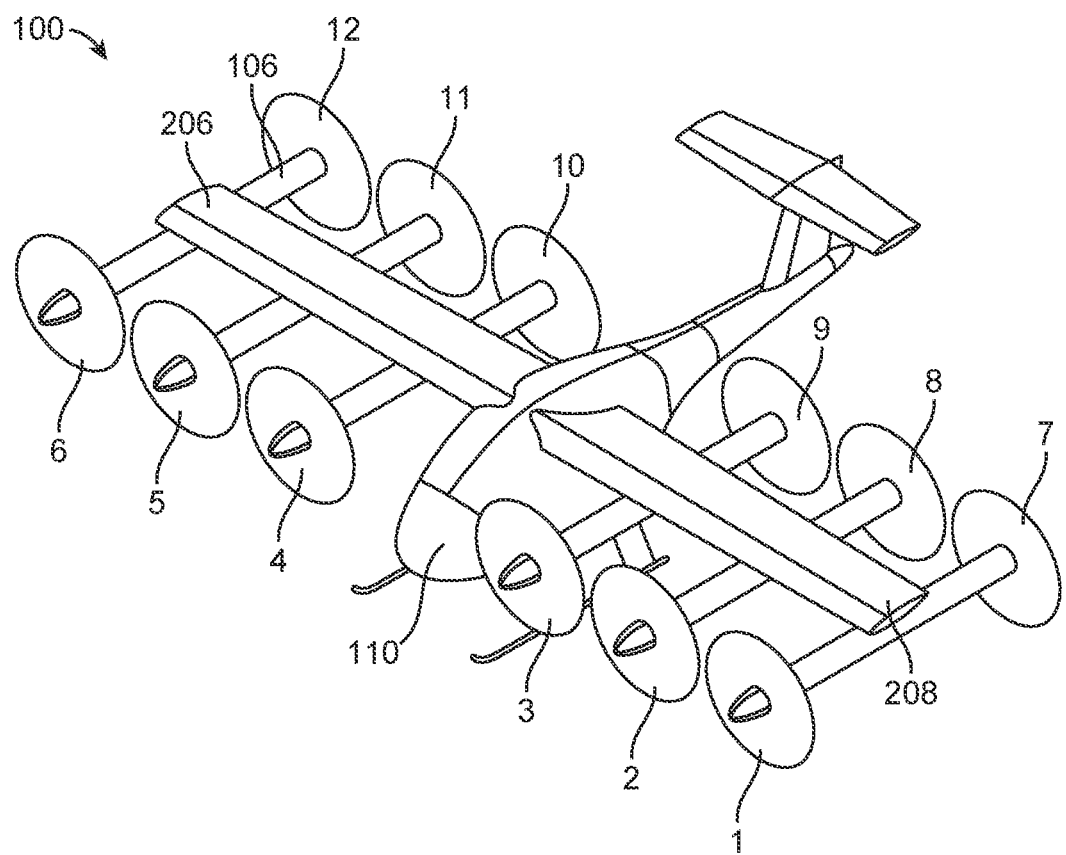
FIGS. 2A-2B illustrates the exemplary VTOL aircraft including tilting fans coupled in pairs to support elements, according to various embodiments.
Figure 2B:
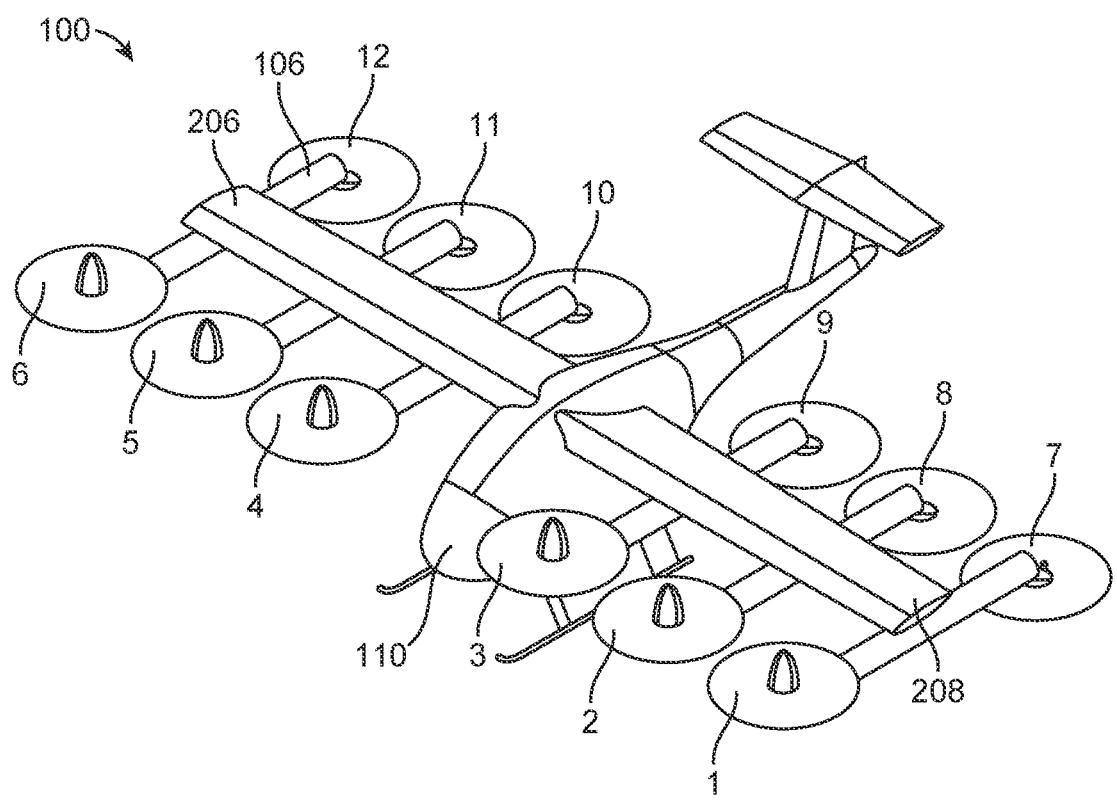

FIGS. 2A-2B illustrate the exemplary VTOL aircraft 100 including a right wing 206 and a left wing 208 each coupled with the fuselage 110 of the VTOL aircraft 100. The at least one wing of the VTOL aircraft 100 includes a right wing 206 portion and a left wing 208 portion. In the exemplary embodiment shown in FIGS. 2A-2B, the VTOL aircraft 100 further includes 6 support elements 106, and 12 tilting fans, coupled in pairs to 6 support elements 106. As shown in FIGS. 2A-2B, 3 support elements 106 are coupled to each wing 206, 208 of the VTOL aircraft 100. For ease of reference, the tilting fans may be numbered as shown for ease of reference. The front tilting fans 102 may be numbered 1-6, and the aft tilting fans 104 may be numbered 7-12.

The tilting fans 1-12 may be switched (e.g. rotated or tilted) between a forward flight position (illustrated in FIG. 2A) and a vertical flight position (illustrated in FIG. 2B). That is, FIG. 2A illustrates the tilting fans 1-12 (e.g. the blades of the tilting fans) in a vertical position for forward motion. FIG. 2B illustrates the tilting fans 1-12 (e.g. the blades of the tilting fans) in the horizontal position for vertical flight (e.g. for moving the aircraft in the vertical direction during, for example, take-off, hovering and/or landing). In the implementation shown in FIGS. 2A-2B, all tilting fans 1-12 are mounted to the respective support elements 106 in a fixed position relative to the wings 206, 208. The tilting fans 1-12 may be coupled to the support elements 106 via one or more tilting mechanisms including, for example, motors, hydraulic systems, and/or coupling mechanisms. According to various embodiments, each of the tilting fans 1-12 may comprise a respective tilting mechanism.

One of ordinary skill the art will appreciate that the number and location of the tilting fans is not limited to that illustrated in FIGS. 2A-2B and that the VTOL aircraft 100 can include less or more tilting fans, provided at other positions on the wing or on the individual support elements 106.

According to various embodiments, the VTOL aircraft 100 may further include one or more stationary fans, which provide thrust in only one direction (e.g. vertical lift or horizontal flight). For example, in various embodiments, one or more of the plurality of fans on each support element 106 may be a stationary fan which are stationary in a vertical lift position or in a forward flight position during operation.

Figure 3A:
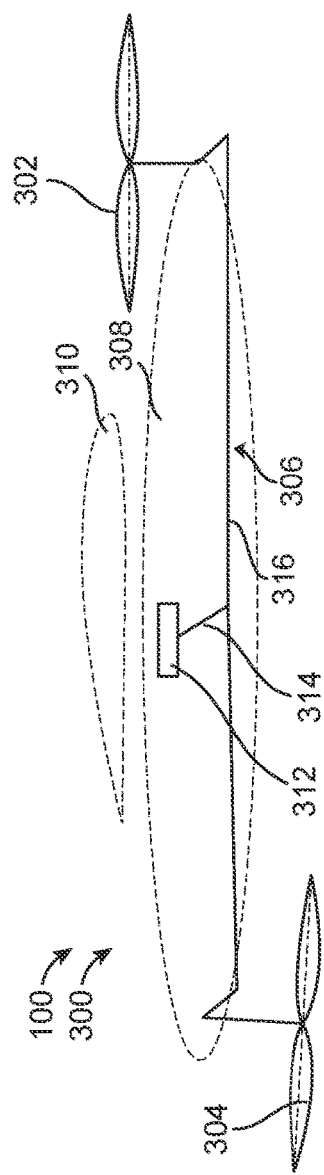
FIGS. 3A-3C illustrates an exemplary control system of the VTOL aircraft, for providing pivoting or tilting of a plurality of tilting fans, according to various embodiments.
Figure 3B:
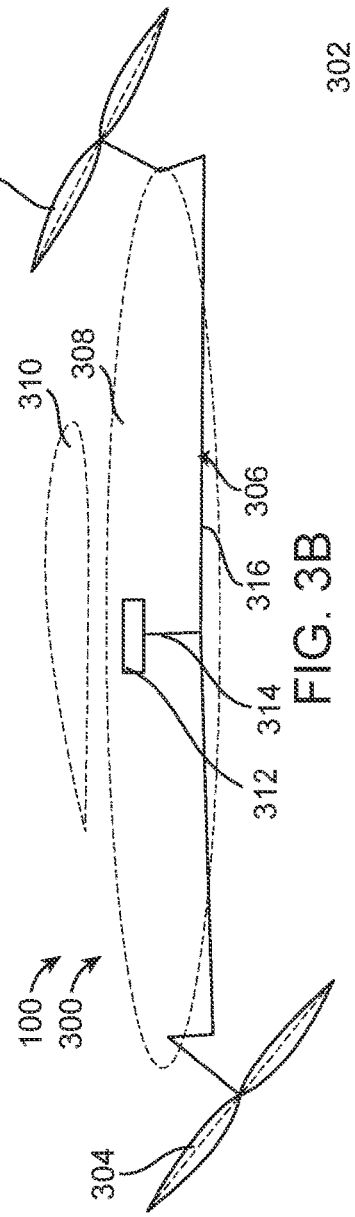
Figure 3C:
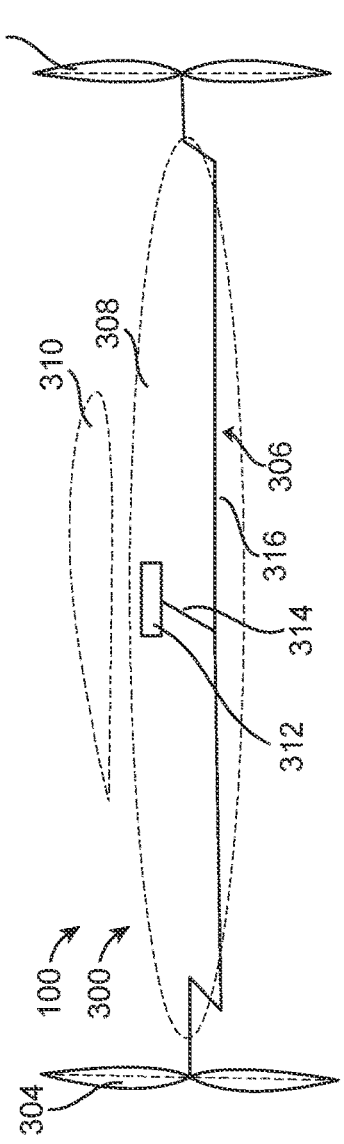

FIGS. 3A-3C show exemplary control systems 300 for providing pivoting or tilting of tilting fans 302, 304 of the VTOL aircraft 100. For example, the control system 300 may include a tilting mechanism 306. In various embodiments, the tilting mechanism 306 may be coupled to or provided (e.g. housed or embedded) within a support element 308. The forward tilting fan 302 and aft tilting fan 304 may be coupled to opposite ends of the support element 308. The support element 308 may be provided, for example, underneath the wing 310 and coupled to the wing 310 or the fuselage of the VTOL aircraft 100.

The tilting mechanism 306 may operably couple with a forward tilting fan 302 and an aft tilting fan 304. Thus, the tilting mechanism 306 may control the forward tilting fan 302 and the aft tilting fan 304 simultaneously. As shown in FIGS. 3A-3C, the tilting mechanism 306 may be a mechanical mechanism which can move from a first position to a second position. For example, the tilting mechanism may include a drive shaft 314 which pushes one or more elongated elements (e.g. bars) 316 horizontally, or in a horizontal direction. The drive shaft 314 may be located within the support element 308.

In FIG. 3A, the tilting mechanism 306 may be in the first position with the tilting fans 302, 304 are in a vertical lift position, providing thrust in a vertical direction. Specifically, the drive shaft 314 is angled towards the front of the VTOL aircraft 100. As shown in FIG. 3B, as the tilting mechanism 306 moves towards the second position, the tilting fans 302, 304 may transition towards a forward flight position. Specifically, the drive shaft 314 is angled vertically such that the elongated element 316 is pushed rearward, forcing the tilting fans 302, 304 towards a horizontal position.

As shown in FIG. 3C, the tilting mechanism 306 has reached the second position, such that the tilting fans 302, 304 have been transitioned fully to a forward flight position, where thrust may be applied in a horizontal direction. At the second position, the drive shaft 314 is angled rearwards and forces the tilting fans 302, 304 to a forward flight position.

In vertical lift position, the forward tilting fan 302 may be positioned upward and above the support element 308. Conversely, the aft tilting fan 304 may face downward and below the support element 308 in the vertical lift position. With the tilting mechanism 306 in the second position, such that the tilting fans are in a forward flight position, the forward tilting fan 302 may be facing forward, towards the front of the VTOL aircraft 100, and the aft tilting fan 304 may be facing rearwards towards the back of the VTOL aircraft 100. As such, with the tilting fans 302, 304 mirroring their orientation with respect to one another, a single motion actuating the tilting mechanism 306 may result in simultaneous tilting of both of the tilting fans 302, 304.

According to some embodiments, both the forward tilting fan 302 and the aft tilting fan 304 may be positioned on a same side (e.g. upward/above or downward/below) of the support element 308 in the vertical lift positon. According to some embodiments, both the forward tilting fan 302 and the aft tilting fan 304 may be facing a same side (e.g. forward/towards the front or backward/toward the back) of the support element 308 in the forward flight position.

In some embodiments, the control system 300 of the VTOL aircraft 100 may further include an actuator 312. The actuator 312 may operably couple with the tilting fans 302, 304 via the tilting mechanism 306. Specifically, as shown in the figures, the drive shaft 314 couples the actuator 312 to the bar 316. As such, the actuator 312 may act to change the angle of the drive shaft 314, thus moving the bar 316. For example, the actuator 312 may be a motor or other powered system which moves the tilting mechanism 306 from the first position to the second position. As shown in FIG. 3A the actuator 312 is provided (e.g. housed or embedded) within the support element 308. Such a configuration may allow the actuator 312 to be close to the bar 316, such that the drive shaft 314 to be shorter, such as to reduce weight.

According to various embodiments, the actuator(s) described herein, which may drive the motion of the tilting mechanisms may include, among other components, a rotary electric motor (with or without a gearbox), a linear direct drive electric motor, a ball screw actuator (e.g. a rotary electric motor with ball screw transmission to get linear motion), a hydraulic piston, or a pneumatic piston.

The exemplary embodiment illustrated in FIGS. 3A-3C have the advantage of including half as many actuators when compared to having a first actuator for the aft tilting fan 304 and a second actuator for the front tilting fan 302. This configuration increases the reliability of the design by reducing the number of parts (e.g. actuators) that can potentially fail, as well as reducing the weight and power loss of having two separate actuators (i.e. one for each tilting fan 302, 304).

FIGS. 4A-4C show exemplary control systems 400 for providing pivoting or tilting of tilting fans 402, 404 of the VTOL aircraft 100. For example, the control system 400 may include a tilting mechanism 406. In various embodiments, the tilting mechanism 406 may be coupled to or provided (e.g. housed or embedded) within (a support element 408. The forward tilting fan 402 and aft tilting fan 404 may be coupled to opposite ends of the support element 408. The support element 408 may be provided, for example, underneath the wing 410 and coupled to the wing 410 or the fuselage of the VTOL aircraft 100.

The tilting mechanism 406 may operably couple with a forward tilting fan 402 and an aft tilting fan 404. As shown in FIGS. 4A-4C, the tilting mechanism 406 may include a mechanical system which can move from a first position to a second position. For example, the tilting mechanism 406 may include a drive shaft 414 which pushes one or more elongated elements (e.g. bars) 416 horizontally. The drive shaft 414 may be located at least partially within the wing 410.

In FIG. 4A, the tilting mechanism 406 may be in the first position with the tilting fans 402, 404 in a vertical lift position, providing thrust in a vertical direction. Specifically, the drive shaft 414 is angled towards the front of the VTOL aircraft 100. As shown in FIG. 4B, as the tilting mechanism 406 moves towards the second position, the tilting fans 402, 404 may transition towards a forward flight position. Specifically, the drive shaft 414 is angled vertically such that the bar 416 is pushed rearward, forcing the tilting fans 402, 404 towards a forward flight position.

As shown in FIG. 4C the tilting mechanism 406 has reached the second position, such that the tilting fans 402, 404 have been transitioned fully to a forward flight position, where thrust may be applied in a horizontal direction. At the second position, the drive shaft 414 is angled rearwards and has forced the tilting fans 402, 404 to a horizontal direction.

In vertical lift position, the forward tilting fan 402 may be positioned upward and above the support element 408. Conversely, the aft tilting fan 404 may face downward and below the support element 408 in the vertical lift position. With the tilting mechanism 406 in the second position, such that the tilting fans are in a forward flight position, the forward tilting fan 402 may be facing forward, towards the front of the VTOL aircraft 100, and the aft tilting fan 404 may be facing rearwards towards the back of the VTOL aircraft 100. As such, with the tilting fans 402, 404 mirroring their orientation with respect to one another, a single motion actuating the tilting mechanism 406 may result in simultaneous pivoting of both of the tilting fans 402, 404.

In various embodiments, the control system 400 of the VTOL aircraft 100 may further include an actuator 412. The actuator 412 may operably couple with the tilting fans 402, 404 via the tilting mechanism 406. Specifically, as shown in the figures, the drive shaft 414 couples the actuator 412 to the elongated element (e.g. bar) 416 of the tilting mechanism 406. As such, the actuator 412 may act to change the angle of the drive shaft 414, thus moving the bar 416. For example, the actuator 412 may be a motor or other powered system which moves the tilting mechanism 406 from the first position to the second position. As shown in FIG. 4A, the actuator 412 is positioned within the wing 410. Such a configuration may allow the actuator 412 to be distanced further from the bar 416, such that additional torque may be applied to the bar 416. Further, the embodiment illustrated in FIGS. 4A-4C allows the rotational axis for the tilting fans 402, 404 to be provided in the wing 410.

According to various embodiments, the drive shaft 414 connects a plurality of tilting fans together so that an actuator 412 drives tilting of all tilting fans (individually, in subsets or all together) of the VTOL aircraft 100. In the exemplary embodiment illustrated in FIGS. 4A-4C, all tilting fans 402, 404 coupled to the same wing 410 may be controlled using a single drive shaft 414, such as one which goes through the wing 410. For example, the drive shaft 414 may go through the horizontal center of the wing 410. Such an exemplary system may have improved reliability compared to having independent actuators (one actuator for each tilting fan).

While discussed in FIGS. 4A-4C as a VTOL aircraft 100 having a front tilting fan 402 and an aft tilting fan 404, it should be appreciated from a three-dimensional perspective that the VTOL aircraft 100 may have a number of support elements 408, which each comprise a plurality of tilting fans. As such, the front tilting fan 402 and aft tilting fan 404 in one support element may be connected via one tilting mechanism 406 and positioned with one actuator 412. Further, other tilting fans coupled on other support elements 408, or other wings 410 may be connected to the same tilting mechanism 406 and/or be positioned with the same actuator 412. For example, a right wing 206 may have 3 front tilting fans (4, 5, 6) and three aft tilting fans (10, 11, 12), which are all controlled by one control system 400, including one actuator 312. A similar structure may be true for the plurality of fans coupled with the left wing 208. In various embodiments, each of the plurality of tilting fans on each of the wings, 206, 208 may be controlled by separate control systems 400, or may share various components including the actuator 412. Alternatively, a predetermined number of tilting fans may be grouped together (e.g. tilting fans coupled to a given wing, given support elements, front tilting fans, or any other configuration) and may be controlled using a single actuator. According to yet other embodiments, different drive shafts may extend through the wing to actuate different tilting fans. According to yet other embodiments, the VTOL aircraft 100 may include stationary fans in addition to tilting fans 402, 404.

The actuator size required to tilt a single fan is at least partially related to the gyroscopic torque applied to the tilting mechanism due to gyroscopic reaction torque from aircraft attitude changes. The gyroscopic torque equation is:

$$\text{Gyro\_torque} = \text{cross\_product}(\text{omega\_airplane}, J*\text{omega\_fan})$$

Where gyro_torque, omega_airplane, and omega_fan are all vector quantities. Omega_airplane is the time rate of change of aircraft attitude and omega_fan is the speed the fan spins to provide propulsion force. The J variable is the polar moment of inertia of the fan.

For airplanes that have multiple fans, omega_airplane is the same for all fans because they are all connected to the same relatively rigid airframe. In some embodiments, all fans may have the same polar moment of inertia. While some fans may spin clockwise, other fans may spin counterclockwise. In some embodiments, the number of fans that spin clockwise may be equal to the number of fans that spin counterclockwise. In some embodiments, all of the fans may spin at the same rate (e.g. the magnitude of omega_fan is the same for all fans, but the sign may be positive or negative).

In some embodiments where multiple fans are tilted using a single actuator, the mechanism may be designed such that the spin axis of all of the fans are approximately parallel. The embodiments shown in FIGS. 3A-3C, 4A-4C, and 8A-8C are examples of this type of mechanism. In cases where the number of fans that are connected together in this way is two, it is possible to spin one clockwise and the other counterclockwise. This configuration has the benefit of having the gyroscopic torque of one fan cancel the gyroscopic torque of the other fan (referred as "the cancellation effect"), thus reducing the size of the actuator that must be used to provide the tilting motion. A reduced size actuator will be lighter, which is a large benefit in the design of an aircraft. In further embodiments with multiple even number of fans connected with one mechanism, the cancellation effect can be had if one half of the fans spin in one direction and the other half of the fans spin in the other direction.

In some embodiments, tilting fans may be paired based on failure state. According to various embodiments, when one of the fans fail, it is preferable to shut off a corresponding fan to equalize (balance) the failure and keep the aircraft in (or nearly in) balance. The corresponding fan may be diametrically symmetric to the failing fan with respect to a center of gravity of the aircraft. For example, referring back to FIG. 2A, the fan no. 8 may be paired with fan no. 5. Fan no. 8 is diametrically symmetric to fan no. 5 with respect to the center of gravity of the aircraft. If fans no. 5 and 8 fail together, there is no impact on the VTOL aircraft 100 such that the remaining fans will keep the aircraft in balance. Accordingly, the tilting fans that are paired based on failure state may be connected to a same tilting mechanism. For example, the tilting fans may be connected to a driveshaft in the wing and coupled to the same actuator. Thus, instead of having the tilting fans of the same support element coupled to the same actuator (as illustrated in FIGS. 3A-3C), the tilting fans that are paired based on failure state may be coupled to the same actuator in FIGS. 4A-4C. The exemplary embodiment illustrated in FIGS. 4A-4C includes half as many actuators as in an embodiment where each tilting fan has its own actuator, and yet provides the same level of safety as in the embodiment where each tilting fan has its own actuator.

Figure 5A:
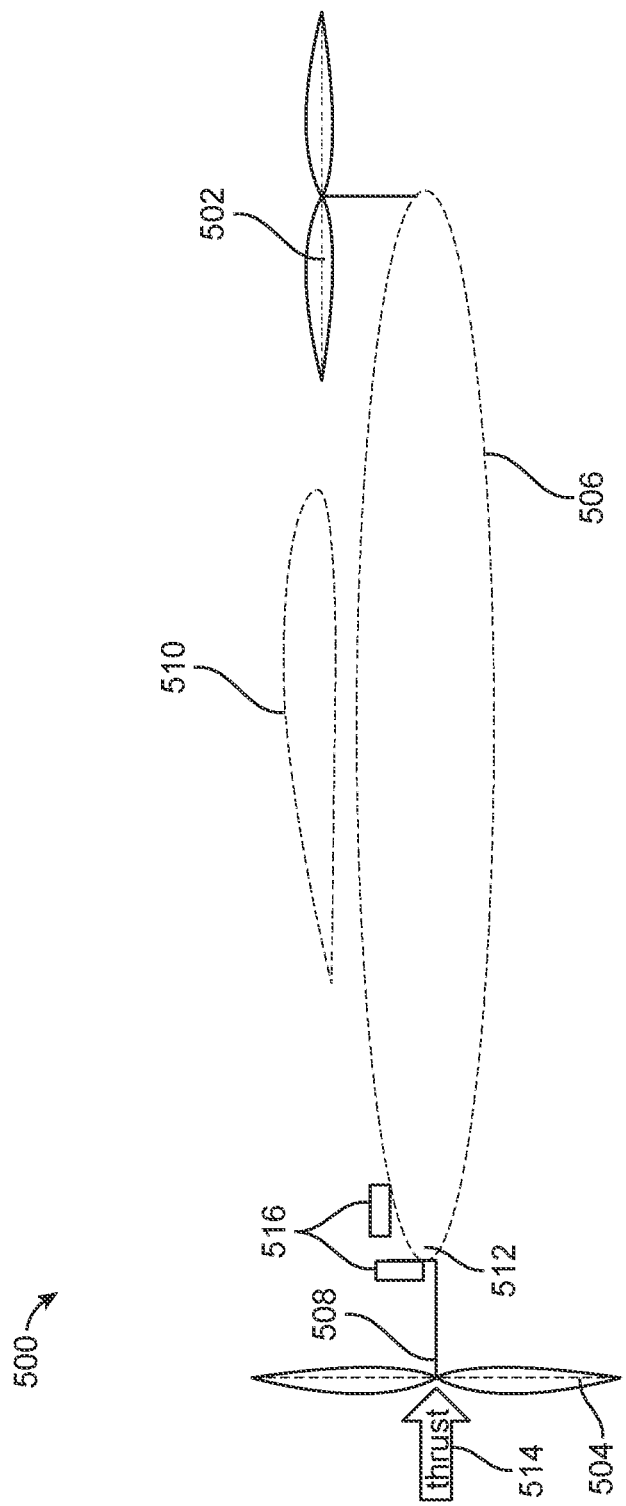
FIG. 5A illustrates an exemplary embodiment where, a front tilting fan and an aft tilting fan are coupled to a support element, according to various embodiments.

FIG. 5A illustrates an exemplary embodiment of a VTOL aircraft 500, where a front tilting fan 502 and an aft tilting fan 504 are coupled to a support element 506. The support element 506 may be provided underneath the wing 510 and/or coupled to the wing 510 or the fuselage of the VTOL aircraft. The aft tilting fan 504 is used during the forward flight and has variable pitch. The front tilting fan 502 may include, for example, 2, 3, 4, or 5 blades. In the exemplary embodiment, the aft tilting fan 504 may only provide thrust in the vertical flight mode, does not have variable pitch, and may be optimized for vertical flight. In forward flight, the aft fan 504 may not be utilized and as such will provide little or no thrust. The aft tilting fan 504 may include, for example, 2, 3, 4 or 5 blades. In forward flight, the aft tilting fan 504 may either freewheel or fold to reduce drag. The aft fan 504 may be rotatably coupled to a back end of the support element 506 via any suitable coupling means, such as an arm 508. One or more travel limiting stops 516 may be coupled to the back end of the support element 506, closer to the aft tilting fan 504. The travel limiting stops 516 may act to limit the rotation angle of the arm 508, and thus the aft tilting fan 504. For example, the arm 508 may only rotate between a vertical direction (such that the aft tilting fan 504 is positioned directly downwards of the support element/wing/fuselage) and a horizontal direction (such that the aft tilting fan 504 is point directly rearwards of the support element/wing/fuselage).

In some embodiments, a spring element 512 may hold the arm 508 against one of the travel limiting stops 516. Like a spring loaded hinge, the spring element 512 may act to provide a preload on the arm 508, such that force required to tilt the aft tilting fan 504 from a vertical lift position to a forward flight position may be reduced by the spring. The thrust 514 from the aft tilting fan 504 may exceed preload of the spring element 512 at a predetermined rpm speed (a threshold thrust value) of the aft tilting fan 504 causing the arm 508 and the aft tilting fan 504 to tilt. Accordingly, the aft tilting fan 504 may passively move, and is "passive" in the sense that no actuator or powered mechanism is coupled to the aft tilting fan 504 to tilt the aft tilting fan 504 from a vertical to horizontal position, or vice versa. Nevertheless, by utilizing a passive tilting mechanism actuated by thrust of the aft tilting fan 504, the aft tilting fan 504 is configured to pivot or tilt from a vertical lift position (where the aft tilting fan 504 may be used for thrust) to a forward flight position (where the aft tilting fan 504 may not be used for thrust). Further, the passive movement ability of the aft tilting fan 504 allows the aft tilting fan 504 to be mechanically independent from other aft tilting fans or front tilting fans. As such, the capability of the aft tilting fan 504 to tilt from a vertical to a horizontal position (and vice versa), for example as described, may not be dependent on functionality of other tilting fans. For example, failure of the tilting mechanisms or actuators of other tilting fans (forward or aft) may not impact the continued function of the aft tilting fan 504.

For example, in the exemplary VTOL aircraft 100 illustrated in FIG. 2A, all the front fans (fans no. 1-6) may be active tilting fans, whereas all the aft fans (fans 7-12) may be passive tilting fans. This configuration may result in reduction of vibration on the VTOL aircraft as the aft fans receive the wake from the wing which is very turbulent, whereas the front fans ingest clean air that result in quiet flight and low vibration. The front fans can be coupled in various ways such that any number of the front fans can be coupled to an actuator (e.g. each front fan can be coupled to its own individual actuator, or any number of front fans can be grouped together and coupled to an actuator).

Figure 5B:
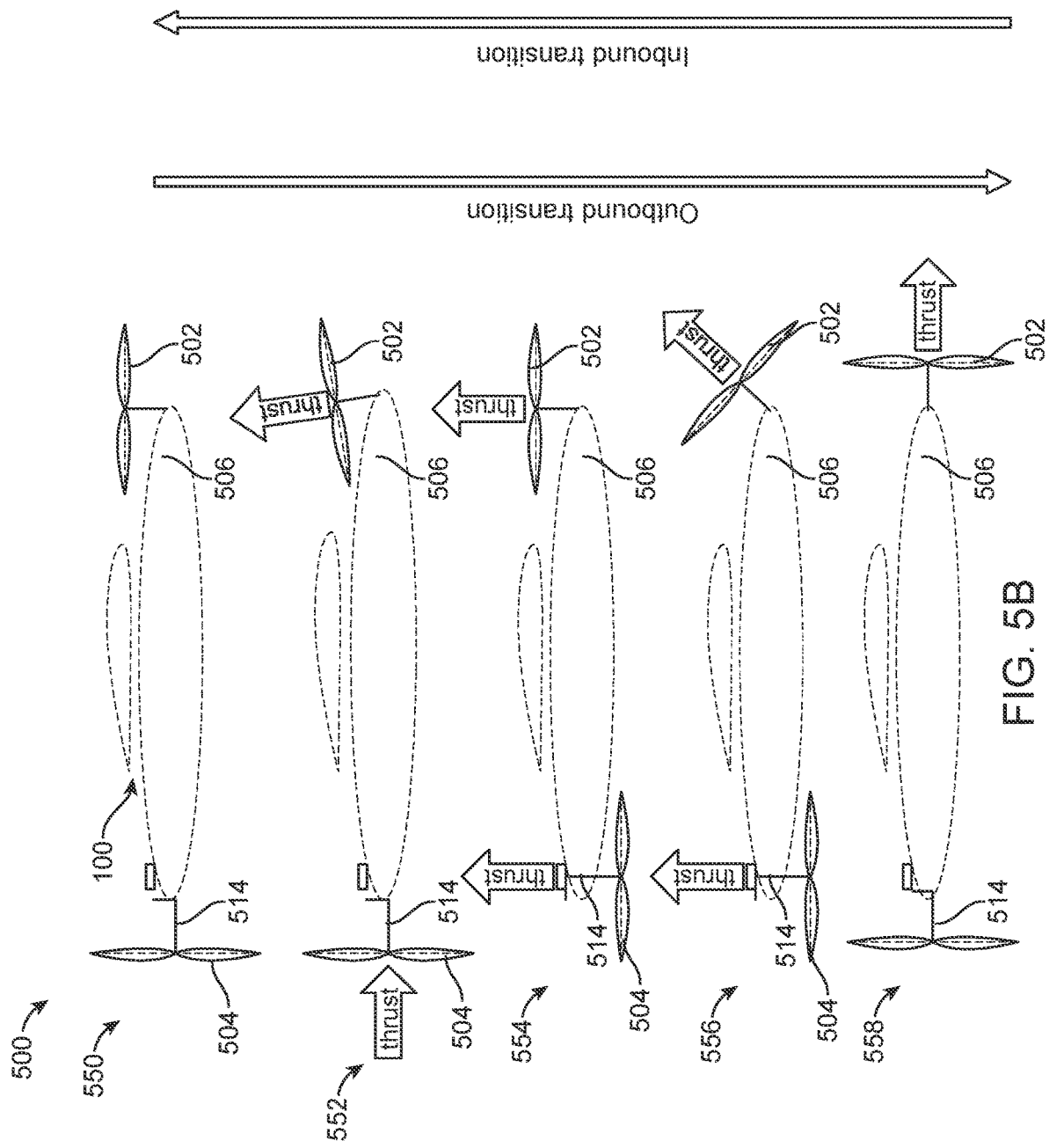
FIG. 5B illustrates the positions of the front tilting fan and the aft tilting fan during inbound (e.g. from flight to landing) and outbound (e.g. from stationary to flight) transitions of the VTOL aircraft, according to various embodiments.

FIG. 5B illustrates the positions of the front tilting fan 502 and aft tilting fan 504 during inbound (e.g. from flight to landing) and outbound (e.g. from stationary to flight) transitions of the VTOL aircraft. At stage 550, the VTOL aircraft 500 is in stationary mode (e.g. on the ground). The aft tilting fan 504 is in vertical position with respect to the support element 506 (or the fuselage of the VTOL aircraft 500), and the front tilting fan 502 is in a horizontal position with respect to the support element 506 whereto the front tilting fan 502 and the aft tilting fan 504 are coupled.

At stage 552, the VTOL aircraft 500 is in vertical flight mode (e.g. take-off/landing mode). The aft tilting fan 504 remains in vertical position with respect to the support element 506, and the front tilting fan 502 is tilted at an angle toward the fuselage of the VTOL aircraft 500. The total vertical thrust from the front tilting fan 502 and the aft tilting fan 504 starts lifting the VTOL aircraft 500 up if the VTOL aircraft 500 is on the flow, or lowers the aircraft toward the ground if the VTOL aircraft 500 is airborne. At stage 552, the thrust does not exceed the spring preload on the arm 508.

At stage 554, the VTOL aircraft 500 is airborne and in hover mode. The thrust exceeds the spring preload on the arm 508, and the aft tilting fan 504 is tilted to be in a horizontal position (e.g. parallel to the support element 506 and/or the fuselage). The front tilting fan 502 is also in a horizontal position with respect to the support element 506. At stage 554, both the front tilting fan 502 and the aft tilting fan 504 may provide thrust and enable the VTOL aircraft 500 hover.

At stage 556, the VTOL aircraft 500 is in a transition mode. The aft tilting fan 504 remains in the horizontal position with respect to the support element 506, and the front tilting fan 502 is tilted at an angle away from the support element 506. The front tilting fan 502 is transitioning to forward flight mode where the front tilting fan 502 will be in a vertical position with respect to the support element 506.

At stage 558, the VTOL aircraft 500 is fully windborne and in forward flight mode. The aft tilting fan 504 is tilted to be in a vertical position with respect to the support element 506 (e.g. perpendicular to the support element 506 and/or the fuselage). The front tilting fan 502 is also in a vertical position with respect to support element 506, providing thrust to move the VTOL aircraft 500 forward. In this exemplary embodiment, during forward flight, the aft tilting fan 504 may not be used, and provides minimal or no thrust. According to various embodiments, the blades of the aft tilting fan 504 may be folded when the aft tilting fan 504 is not in use (e.g. in forward flight mode).

The sequential transition from stage 550 to stage 558 illustrates an outbound transition where the VTOL aircraft 500 takes off from a stationary position on the ground to a forward flight in the air. The sequential transition from stage 558 to stage 550 illustrates an inbound transition where the VTOL aircraft 500 lands to the ground from a forward flight in the air.

Figure 6A:
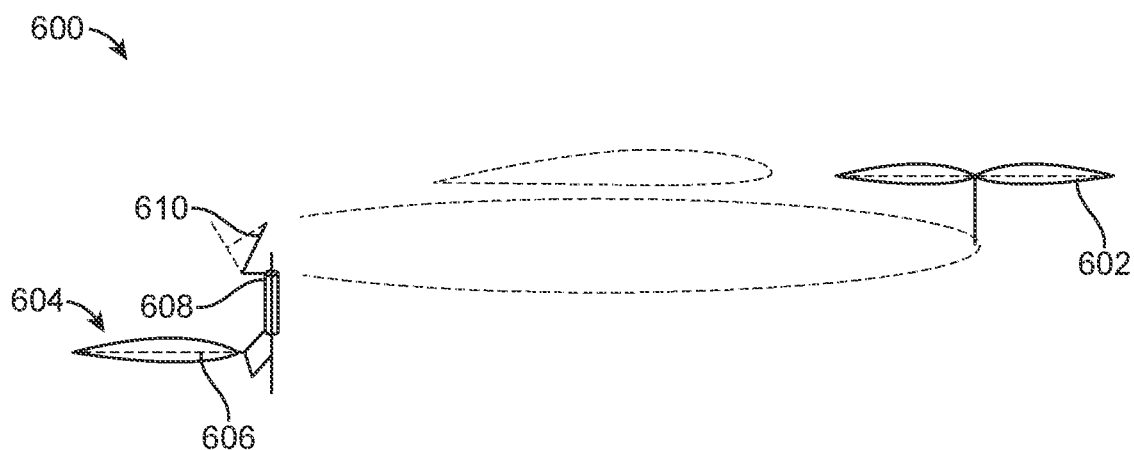
FIGS. 6A-6C illustrate the aft tilting fan tilting from a vertical flight position to a forward flight position, according to various embodiments.
Figure 6B:
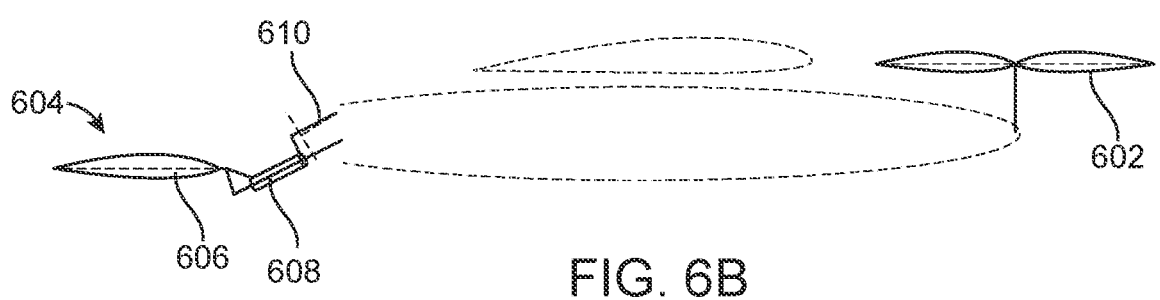
Figure 6C:
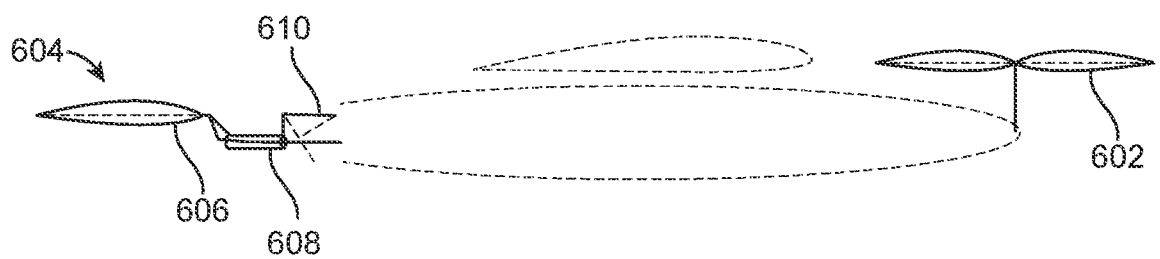

FIGS. 6A-6C show a VTOL aircraft 600 where the aft tilting fan 604 tilts from a horizontal position with respect to a support element or the wing (e.g. vertical flight position) to a vertical position with respect to the support element or the wing (e.g. forward flight position). During forward flight, the aft tilting fan 604 may passively move, and for example may tilt due to lack of centrifugal force on the blades 606 of the aft tilting fan 604. According to various embodiments, the tilting of the aft tilting fan 604 may be passive (e.g. achieved without the use of an actuator), such as using a mechanism (e.g. a spring-loaded mechanism) as discussed with respect to FIG. 5A. The aft tilting fan 604 may be used for vertical flight (e.g. take-off, hovering and/or landing) and may not have variable pitch. The front tilting fan 602 may include various aspects of a control system, such as those discussed with reference to FIGS. 3A-3C and/or 4A-4C. The front tilting fan 602 may have variable pitch, as previously discussed.

Figure 6D:
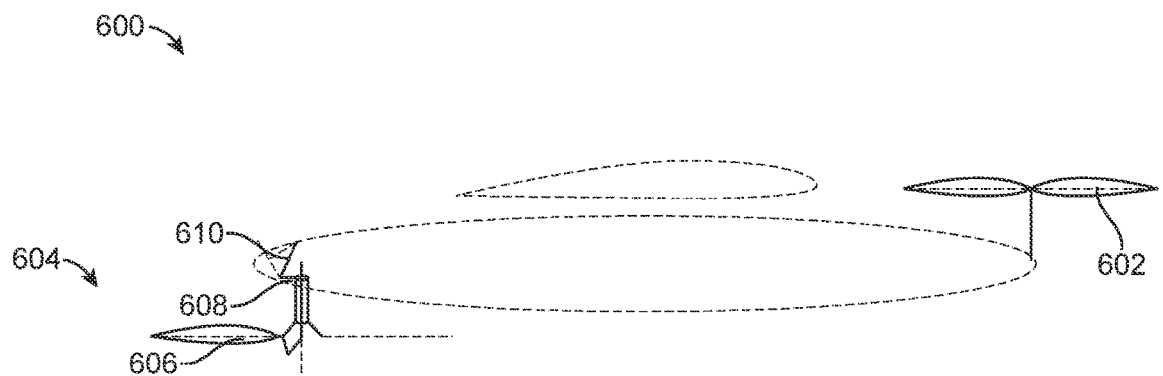
FIGS. 6D-6F illustrates the folding of blades of the aft tilting fan, according to various embodiments.
Figure 6E:
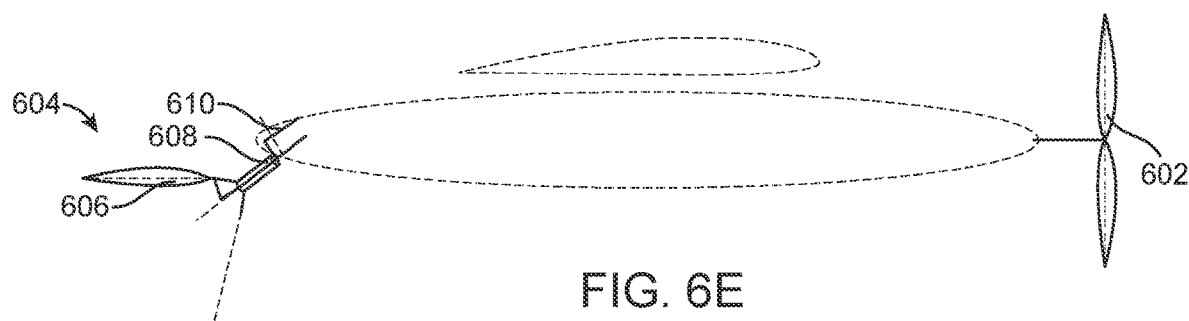
Figure 6F:
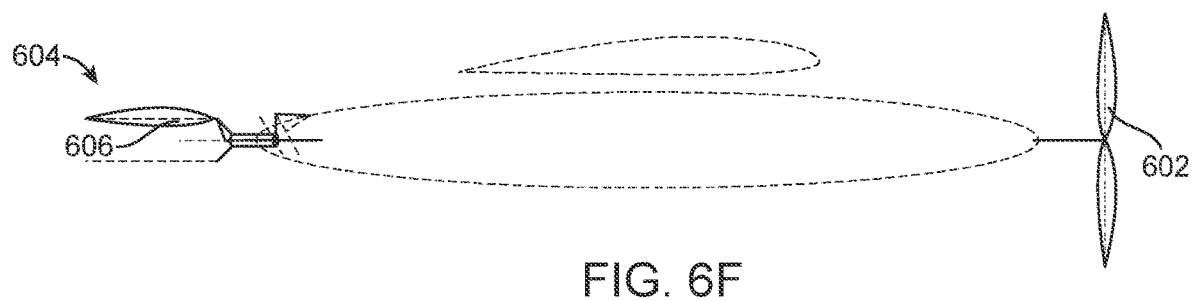

In addition to the aft tilting fan 604 tilting, the blades 606 of the aft tilting fan 604 may fold circumferentially towards each other due to the aerodynamic drag experienced during forward flight, as shown in FIGS. 6D-6F. FIGS. 6A-6F illustrate a single blade 606 for ease of comprehension, however it is understood that the aft fan 604 may include any number of blades. Such folding of the aft tilting fan 604 may reduce aerodynamic drag on the VTOL aircraft 100 during forward flight. As the blades 606 fold together, a first crank slider 608 coupled to a second crank slider 610 may tilt the aft tilting fan 604 to a low drag configuration. The blades 606 fold back from being orthogonal to the rotation axis of the aft tilting fan 604 to being parallel to the rotation axis in the folded position. According to various embodiments, the folding of the blades 606 may be coupled to the tilting of the aft tilting fan 604. For example, a spring element may keep the aft tilting fan 604 in a forward flight configuration where the rotation axis of the aft tilting fan 604 is parallel to the motion of the VTOL aircraft. The spring element may tilt the aft tilting fan 604 at substantially the same time as folding the blades 606 of the aft tilting fan 602. When the unfolding of the blades 606 is coupled with the tilting of the aft tilting fan 604, spinning of the propulsion motor of the aft tilting fan 602 tilts the aft tilting fan 602 into the desired configuration to provide the desired direction of thrust.

According to various embodiments, the front tilting fan 602 may include a variable pitch mechanism, such as discussed previously. When the front tilting fan 602 tilts from the hover configuration to the forward flight configuration, the pitch angle of the blades may change. The variable pitch mechanism includes an actuator that may twist the blades about the blade axis 612. The tilting of the front tilting fan 602 may be coupled to the pitch of the blades of the front tilting fan 602.

Figure 7A:
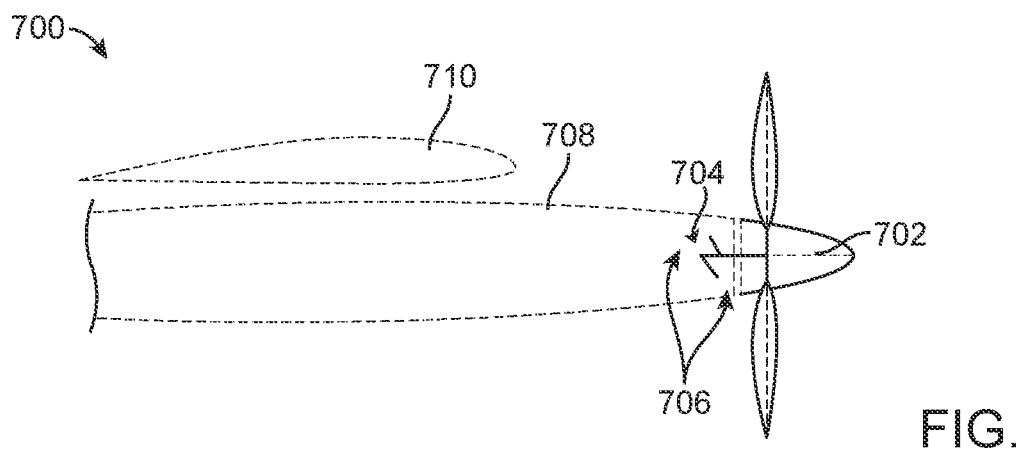
FIGS. 7A-7C illustrate an exemplary control system including an exemplary tilting mechanism for the front tilting fan, according to various embodiments.
Figure 7B:
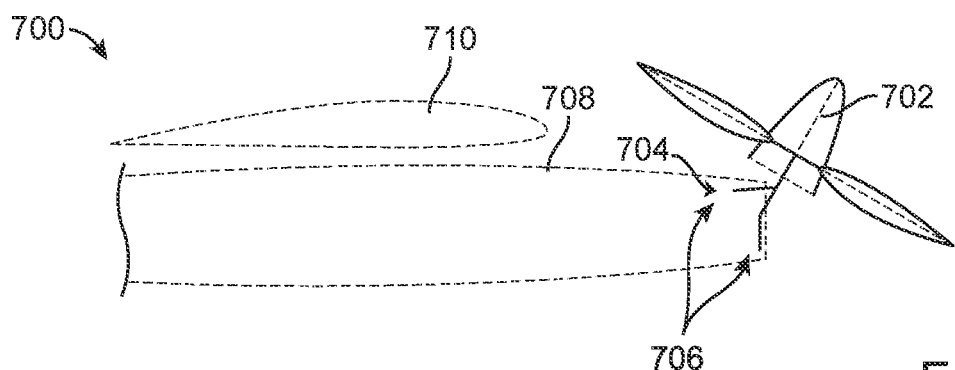
Figure 7C:
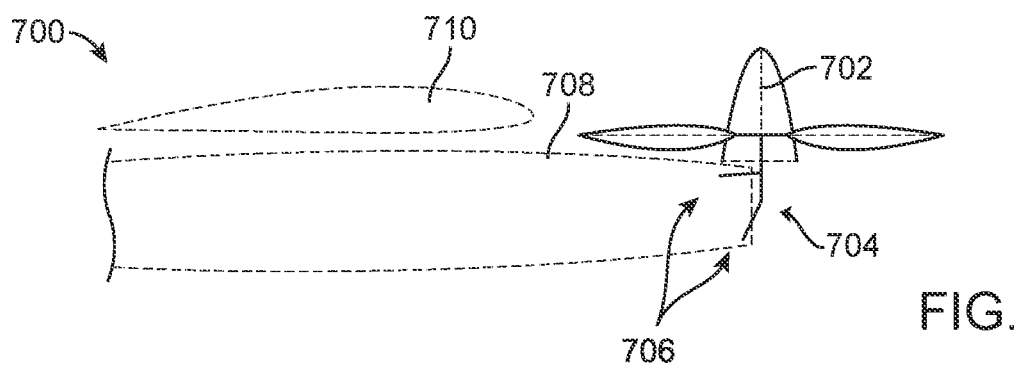

FIGS. 7A-7C show an exemplary control system 700, including a tilting fan 702, where the tilting mechanism 704 includes four bars 706. As described previously, the tilting mechanism 704 may be provided entirely inside the support element 708. For example, incorporating the tilting mechanism 704 within the support element 708 may provide a tight or flush connection between the tilting fan 702 and the support element on the leading edge, such designs may provide reduced drag in the forward flight position. FIGS. 7A-7C illustrate a series of figures where the tilting mechanism 704 tilts the tilting fan 702 from a horizontal position to provide thrust for forward flight (illustrated in FIG. 7A), to a transition position (illustrated in FIG. 7B), to a vertical position to provide thrust for vertical lift (illustrated in FIG. 7C). The control system 700 may include one or more actuators (not shown) which couple to the tilting mechanism 704, such as with a drive shaft, as discussed previously.

The tilting fan 702 may be a front tilting fan 702. Control systems 300 described above, in connection with FIGS. 3A-6F, show the front tilting fan 302 connected to the actuator 312 via a single bar 316 attaching to the front tilting fan 302 and to the drive shaft 314. Conversely, the tilting mechanism 704 may include four bars 706, providing multiple connection (e.g. a four bar linkage) to the front tilting fan 702. According to various embodiments, the four-bar tilting mechanism 704 may provide the advantage of faster and easier alignment of the front tilting fan 702 with the support element 708 in forward flight position, such as to reduce drag without necessitating multiple moving or articulated fairings. Further, the four bars 706 embodiment of the control system 700 may allow for the load path between the front tilting fan 702 and the support element 708 to extend through the wing 710. The load path presents large vibratory loads that tend to break components and size joints. The four-bar tilting mechanism 704 spreads the load among the four bars 706 instead of a single pivot point. Thus, the four-bars act like additional load paths.

Figure 8A:
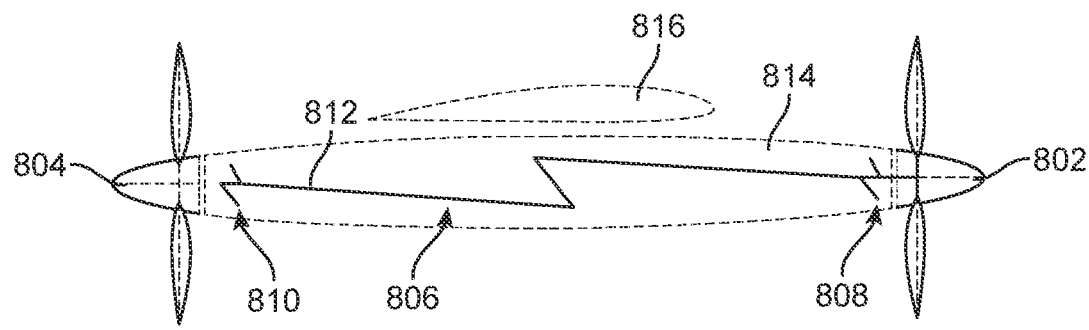
FIGS. 8A-8C illustrate an exemplary control system including exemplary tilting mechanisms for the front tilting fan and the aft tilting fan, according to various embodiments.
Figure 8B:
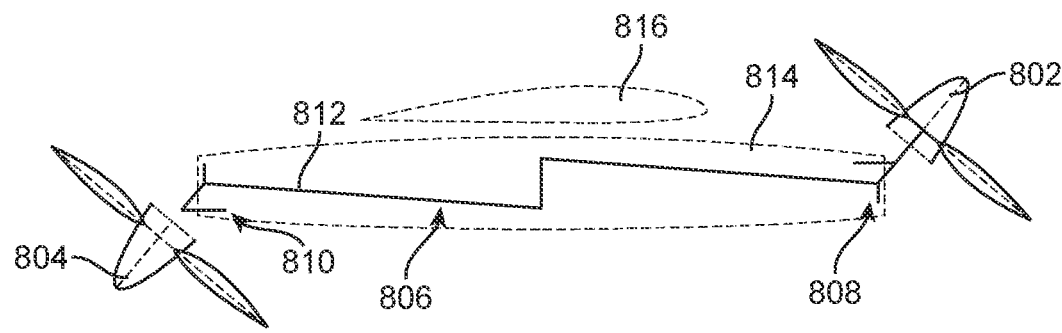
Figure 8C:
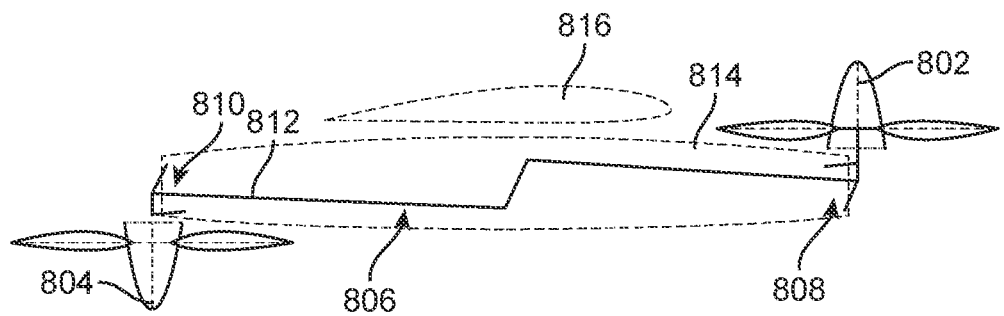

FIGS. 8A-8C show an exemplary control system 800, including a front tilting fan 802 and an aft tilting fan 804. According to various embodiments the control system 800 may include a tilting mechanism 806 operably connecting the front tilting fan 802 and aft tilting fan 804 with an actuator, as previously described.

In various embodiments, one or both the front tilting fan 802 and the aft tilting fan 804 may couple (link) to the tilting mechanism 806 via a front four bar tilting mechanism 808, and an aft four bar tilting mechanism 810, respectively, as illustrated in FIGS. 8A-8C. The front four-bar tilting mechanism 808 and the aft four-bar tilting mechanism 810 may be provided within the support element 814, and may be connected to an actuator (not shown) via a single shaft 812, adapted to tilt both the front tilting fan 802 and the aft tilting fan 804 simultaneously (e.g. substantially at the same time). The actuator may be provided in the middle of the support element 814, or within the wing 816, as previously discussed. FIGS. 8A-8C illustrate a series of figures where the four-bar tilting mechanisms 808, 810 tilt the front tilting fan 802 and the aft tilting fan 804 from a horizontal position to provide thrust for forward flight (illustrated in FIG. 8A) to a transition position (illustrated in FIG. 8B) to a vertical position to provide thrust for vertical lift (illustrated in FIG. 8C).

Figures 1A, 8:
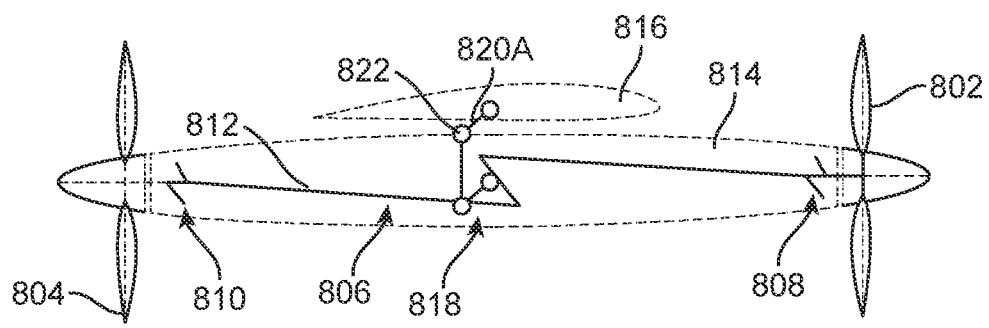
Figures 1B, 8:
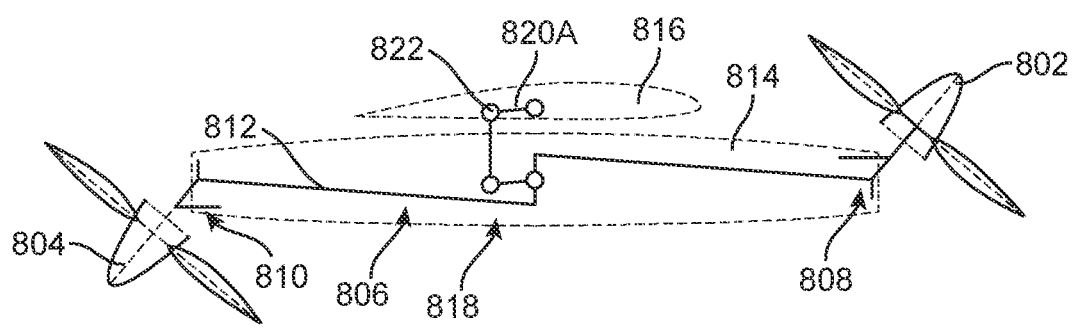
Figures 1C, 8:
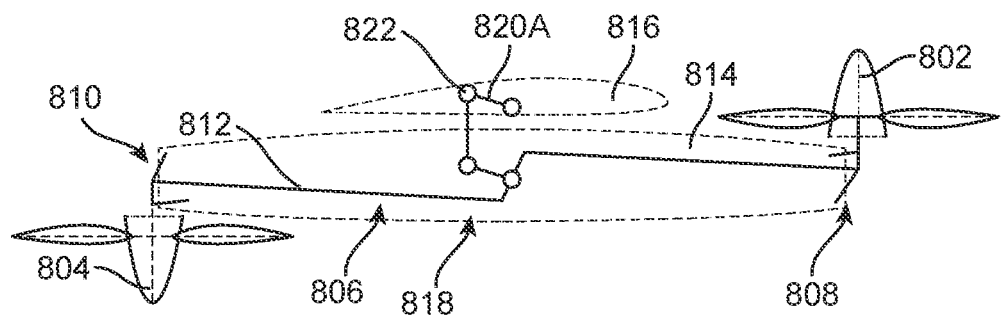

In various embodiments, the four-bar tilting mechanisms 808, 810 may be further coupled to a drive shaft 818 provided in the wing 816 via the single shaft 812, as illustrated in FIGS. 8-1A through 8-1C. Accordingly, the four-bar tilting mechanisms 808, 810 may be driven by the drive shaft 818 through the wing 816. FIGS. 8-1A through 8-1C illustrate a series of figures where the four-bar tilting mechanisms 808, 810 tilt the front tilting fan 802 and the aft tilting fan 804 from a horizontal position to provide thrust for forward flight (illustrated in FIG. 8-1A) to a transition position, to a vertical position to provide thrust for vertical lift (illustrated in FIG. 8-1C).

According to various embodiments, rather than the drive shaft 818 being a single linear structure (such as drive shaft 314), the drive shaft 818 may comprise a plurality of linear structures. For example, the drive shaft 818 may comprise multiple shafts 820, which may be connected via respective connection joints 822. In operation, shaft 820A may couple directly with the actuator and may rotate similarly to drive shaft 314. Shaft 820A may couple with shaft 820B (at a joint 822) which angularly adjusts upon movement of shaft 820A. Furthermore, shaft 820C may couple with shaft 820B (at a joint 824), and may couple at the opposite end to the single shaft 812 to provide motion to the tilting mechanism 806. Use of multiple shafts 820 may allow for similar motion as a single shaft (such as drive shaft 314) but may be capable of utilizing less space, and/or better meeting space limitations of the wing 816 and/or the support element 814.

For fault tolerant aircraft design, it may be beneficial for the tilt mechanism to be designed to be "fail safe"—meaning upon failure of the tilt mechanism, the tilt mechanism stays in or moves to a safe configuration, which may provide balance to the VTOL aircraft and prevent loss of control of the VTOL aircraft. Generally for VTOL aircraft, the thrust required from each fan in hover is higher than the thrust required from each fan in forward flight. Accordingly, if a failure occurs, it would be fail safe if the tilt mechanism could always move to the hover configuration, such that the tilting fans are in vertical lift position, even in the event of an actuator failure. As such, according to various embodiments, a fail-safe mechanism, such as a spring element or similar mechanism (e.g. hydraulic piston), for example, may be provided as part of the tilting mechanism, which may act to tilt or maintain the tilting fan in the hover position. In order to tilt the fan into the forward flight configuration, the actuator must overcome the force of the spring element. Specifically, in the event of a failure of an actuator, the spring element of the tilting mechanism can move the tilting mechanism such that the tilting fans are in the vertical lift position to provide downward thrust.

Figure 9:
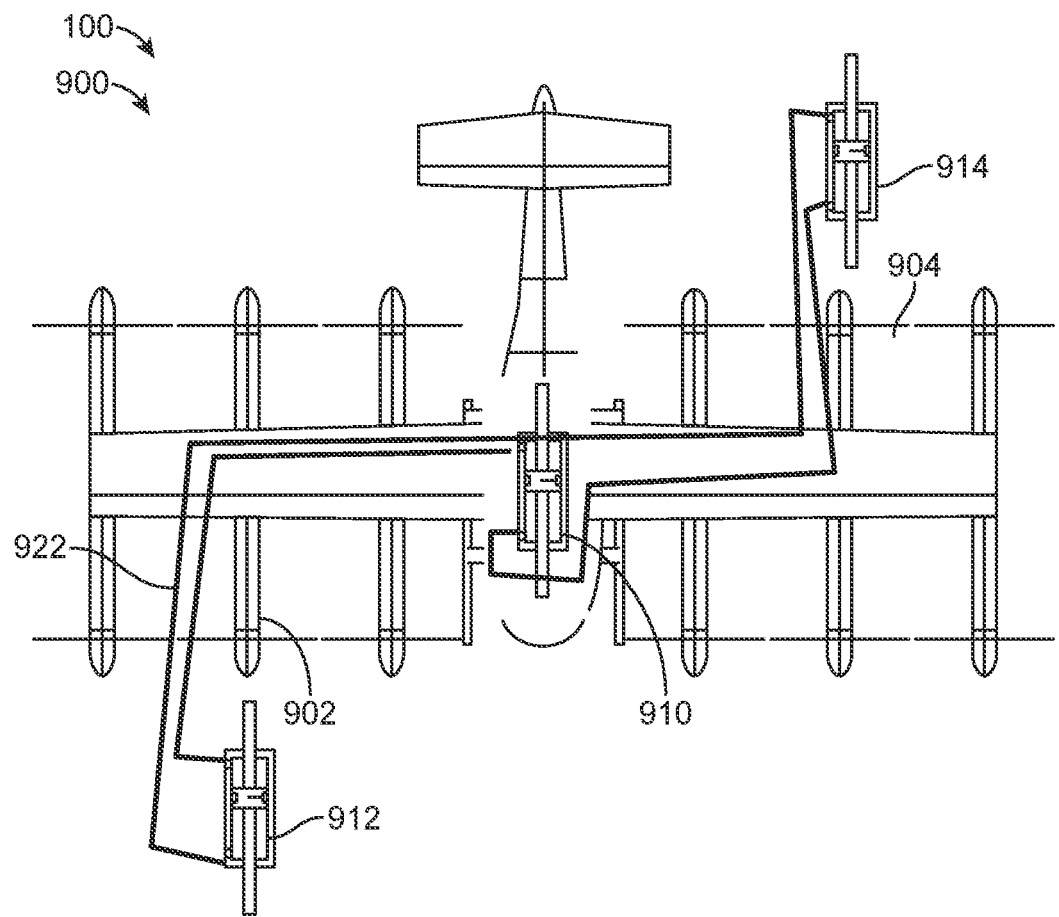
FIG. 9 illustrates an embodiment where one drive (e.g. compressor, valve or primary piston) drives two tilting mechanisms coupled to respective tilting fans that are paired based on failure state, according to various embodiments.

FIG. 9 shows an exemplary schematic of a VTOL aircraft control system 900 having one drive 910 (e.g. actuator, compressor, valve or primary piston) which drives at least two tilting mechanisms 912, 914 coupled to respective tilting fans 902, 904. The tilting fans 902, 904 may be in various locations on the VTOL aircraft, and do not necessarily need to be tilting fans positioned on the same wing or on the same support element.

In designing the control system 900, a "coupling scheme" may be determined on which tilting fans will be linked together by a particular tilting mechanism. As such, the coupling scheme may determine the functionality of which tilting fans correspond with one another. For example, a coupling scheme may include a first subset of the tilting mechanisms, such as tilting mechanism 912 and tilting mechanism 914, which may be operably coupled to drive 910 (e.g. an actuator). The control system 900 may further include a second subset of tilting mechanisms, a third subset of tilting mechanisms, and so forth, which each may be operably coupled to one or more drives.

The plurality of tilting fans may be divided into groups, such as a second group of tilting fans, third group of tilting fans, and so forth, each which may have a separate subset of tilting mechanisms. Each of the groups, or a plurality of groups of the tilting fans (e.g. the first and second group of tilting mechanisms) may be operably coupled to the same actuator. For example, an actuator may tilt the first group of tilting fans and the second group of tilting fans. Conversely, the groups of tilting fans may be operably coupled to separate actuators via subsets of tilting mechanisms. For example, a second actuator may couple to the second subset of the plurality of tilting mechanism, such that the second actuator tilts the second group of tilting fans coupled to the second subset of the plurality of tilting mechanism simultaneously.

According to various coupling schemes contemplated herein, the coupling scheme may be diametrically symmetric with respect to a center of gravity of the VTOL aircraft 100. The coupling scheme may further determine the number of necessary tilting mechanisms and actuators. In determining the coupling schemes, a designer may take into account cost, weight, safety, and various other determinations pertinent to aircraft design.

For example, the tilting fans 902, 904 may be selected to be paired based on failure state. According to various embodiments, when one of the twelve fans fail, it is preferable to shut off a symmetric tilting fan to keep the aircraft in balance. The corresponding tilting fan is diametrically symmetric to the failing fan with respect to a center of gravity of the aircraft. For example, as illustrated in FIG. 9, the tilting fan no. 8 (904) is diametrically symmetric to, and thus may be operably coupled with, tilting fan no. 5 (902). Therefore, the tilting mechanism 914 for tilting fan no. 8 (904) and the tilting mechanism 912 for tilting fan no. 5 (902) may be coupled to a single drive 910. Thus, in case either fan 902 or 904 fails, the corresponding fan 904 or 902 may be deactivated. In the embodiment illustrated in FIG. 9, a single drive (e.g. a ball screw actuator) 910 may be connected to tilting fan no. 8 (904) and tilting fan no. 5 (902) through hydraulic lines 920 and 922, respectively, extending through the wing and the fuselage. The two tilting mechanisms 912, 914 are coupled together and move (e.g. tilt) together. According to various embodiments, other mechanisms which operably couple the tilting fans may be used, as discussed throughout.

Similar to the linking of tilting fans 902, 904 to a drive 910, various groups of tilting fans may be paired or grouped together. For example, other sets of two tilting fans may be selected based on diametric symmetry. In other embodiments, other groups of tilting fans may be coupled to an actuator according to other coupling schemes. Further, while tilting fans 902, 904 are paired based on diametric symmetry, other tilting fans within the same VTOL aircraft 100 may be paired based on other criteria, and thus may be on the same support element or on the same wing. Other groups or pairs of tilting fans may utilize the same drive 910 as tilting fans 902, 904, or may otherwise share components of the control system. However, in various embodiments, other groups or pairs of tilting fans may comprise separate tilting mechanisms and actuators.

According to various embodiments, the control system 900 may be a part of the flight control system of the VTOL aircraft 100. In some embodiments, the control system 900 may include a memory storing executable instructions that, when executed by one or more processors of the control system, cause the one or more processors to tilt one or more of the tilting fans 902, 904 using a tilting mechanism 912, 914 according to a coupling scheme.

Figure 10:
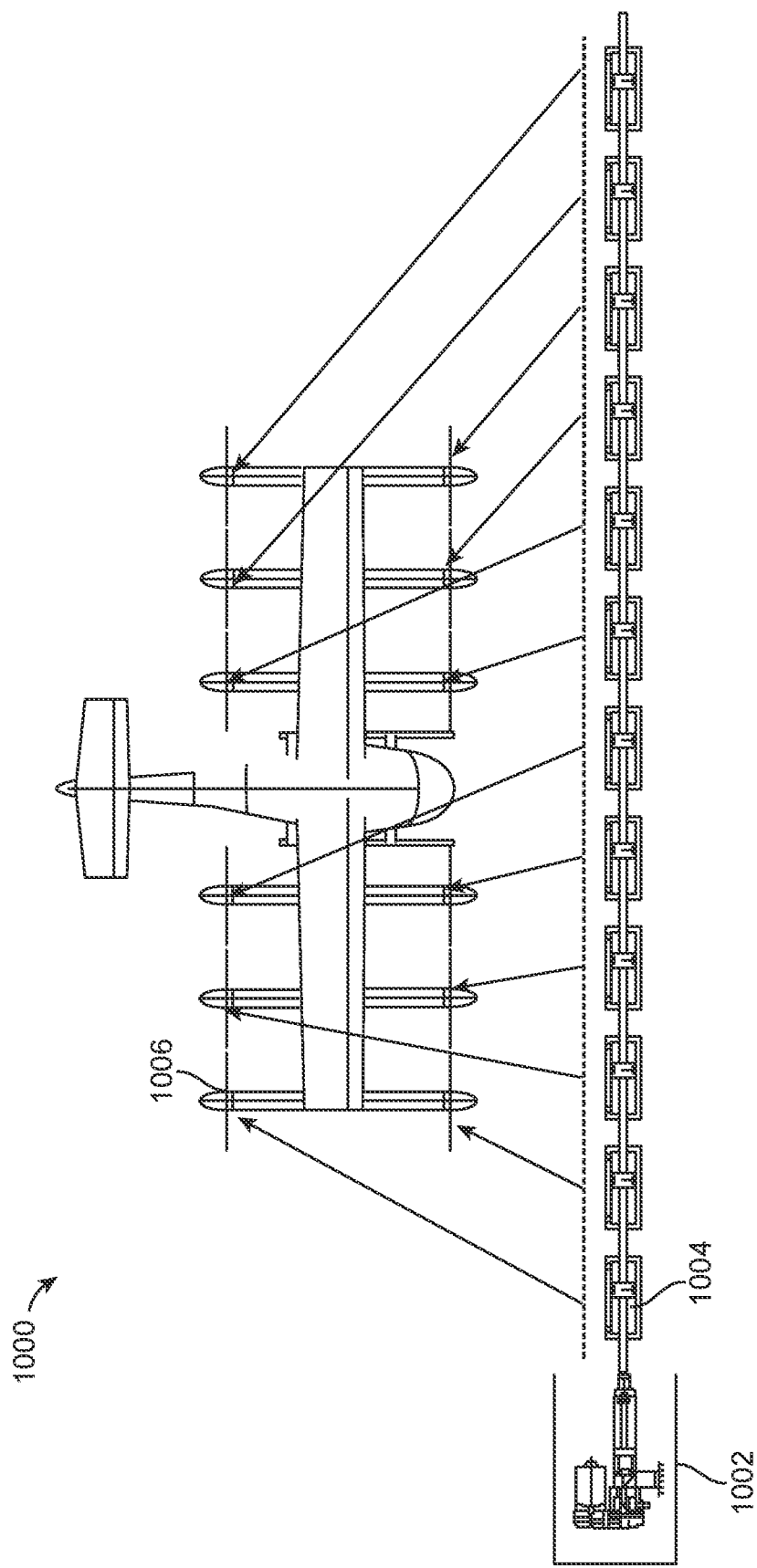
FIG. 10 illustrates a single actuator that drives a plurality of primary cylinders, according to various embodiments.
Figure 11:
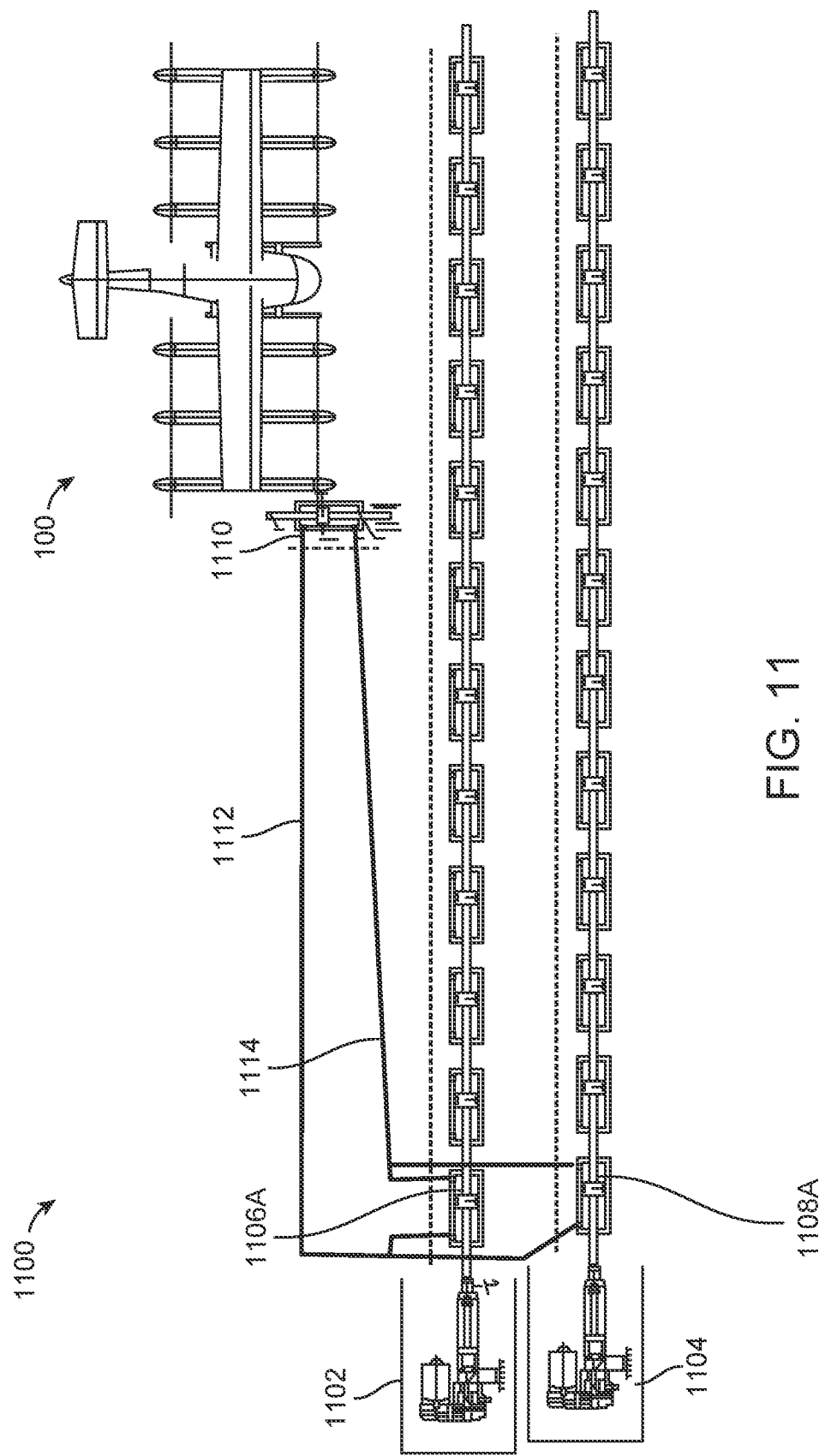
FIG. 11 illustrates an exemplary control system including two actuators, each driving a plurality of primary cylinders, according to various embodiments.

As described above, any number of actuators may be used to drive the tilting mechanisms of the tilting fans. FIGS. 10 and 11 show exemplary embodiments with different number of actuators. As shown in FIGS. 10 and 11, the coupling scheme for the control system includes all of the plurality of tilting mechanisms (e.g. primary cylinders and secondary cylinders), such that a shared actuator tilts all of the plurality of tilting fans.

FIG. 10 illustrates an exemplary control system 1000 which includes an actuator 1002 operably connected with a plurality (e.g. 12) primary cylinders 1004. For example, the plurality of primary cylinders 1004 may function to distribute power from the actuator 1002 to a respective secondary cylinder 1006 coupled to a tilting fan. As such, a tilting mechanism may include a first primary cylinder 1004 operably coupled to a first secondary cylinder 1006 that may operably couple to a first tilting fan. As discussed below, with respect to FIGS. 12A-12B, the actuator 1002 may include a shaft (such as a ball screw shaft). As the shaft rotates, the actuator 1002 may apply a force to a plurality of plungers each respectively included within each of the plurality of primary cylinders 1004. As such, rotation of the shaft of the actuator 1002 may create hydraulic pressure within the primary cylinders 1004. The hydraulic pressure within the primary cylinders 1004 may be applied through a respective hydraulic line or hydraulic lines to the respective secondary cylinder 1006. The secondary cylinders 1006 may act to convert the hydraulic force in the hydraulic line(s) to mechanical force, such as with a plunger. Each of the secondary cylinders 1006 may then link to a tilting fan of the VTOL aircraft, and the plunger of a secondary cylinder 1006 may cause tilting of the respective tilting fan. As such, a single actuator 1002 may operably tilt each of the tilting fans simultaneously by creating hydraulic pressure which is applied via a respective secondary cylinder 1006 to the tilting fan. According to various embodiments, a similar functional effect may be achieved using non-hydraulic systems, such as mechanical system which links the actuator 1002 to the respective tilting fans (such as with gears and mechanical tilting mechanisms).

The exemplary control system 1000 of FIG. 10 may thus provide for a reduction in the number of components necessary to tilt a plurality of tilting fans, by multiple tilting fans being actuated by a single actuator. Further, the programming to control the plurality of tilting fans may be simplified, by only requiring the control of a single actuator. However, shared components may increase the potential that a single failure (e.g. failure of the actuator) would result in an immobile aircraft. As such, additional control system components, as discussed below, may further be included in the VTOL aircraft 100 which provide for redundant powering and tilting of the tilting fans.

FIG. 11 illustrates an exemplary control system 1100 which includes two actuators 1102 and 1104, which operate in parallel to each power respective primary cylinders 1106, 1108. For example, in a VTOL aircraft 100 having 12 tilting fans, each of the actuators 1102, 1104 may have 12 corresponding primary cylinders 1106, 1108. A pair of primary cylinders 1106, 1108 may be coupled to a specific secondary cylinder 1110 corresponding with a tilting fan through hydraulic lines 1112, 1114. For example, actuator 1102 may couple to and power primary cylinder 1106, and actuator 1104 may couple to and power primary cylinder 1108. Primary cylinders 1106 and 1108 may both link to the secondary cylinder 1110 to control a tilting fan (e.g. tilting fan no. 6). Similarly "pairs" of one primary cylinder coupled to the actuator 1102 and another primary cylinder coupled to the actuator 1104 may both connect to another single secondary cylinder. While FIG. 11 illustrates hydraulic lines 1120, 1122 only for a single secondary cylinder 1110, secondary cylinders of all tilting fans may have similar hydraulic line connections to their respective pair of primary cylinders.

As such, this configuration of the control system 1100 adds redundancy to increase the fault tolerance of the overall system. A failure (e.g. a leak) anywhere within the control system 1100 may result in failure of a fan. However, because each actuator 1102, 1104 (and its respective primary cylinders 1106, 1108) are independent of each other, in the event of the failure only a single tilting fan would fail. Each actuator 1102, 1104 may include a ball screw actuator. The redundant ball screws eliminate them as single points of failure (e.g. ball screws are not backdrivable).

According to various embodiments, the system may include additional actuators (e.g. a third actuator also driving 12 primary cylinders in addition to the first two actuators). According to some embodiments, the system may include a plurality of actuators, each actuator driving any number (e.g. 1 to 12) of primary cylinders. As such, a control system 1100 could have multiple sets of respective actuators and primary cylinders in parallel with the actuators 1102, 1104 and primary cylinders 1106, 1108 shown, providing additional layers of failure prevention, for example.

According to various embodiments, the exemplary control system 1100 of FIG. 11 may further include a pitch mechanism in addition to the tilting mechanism coupled to each of the tilting fans. The pitch mechanism and the tilting mechanism may each correspond to one of the secondary cylinders 1110. The primary cylinders 1106, 1108 (and thus the actuators 1102, 1104) may drive both the tilting mechanism and the pitch mechanism together.

Figure 12A:
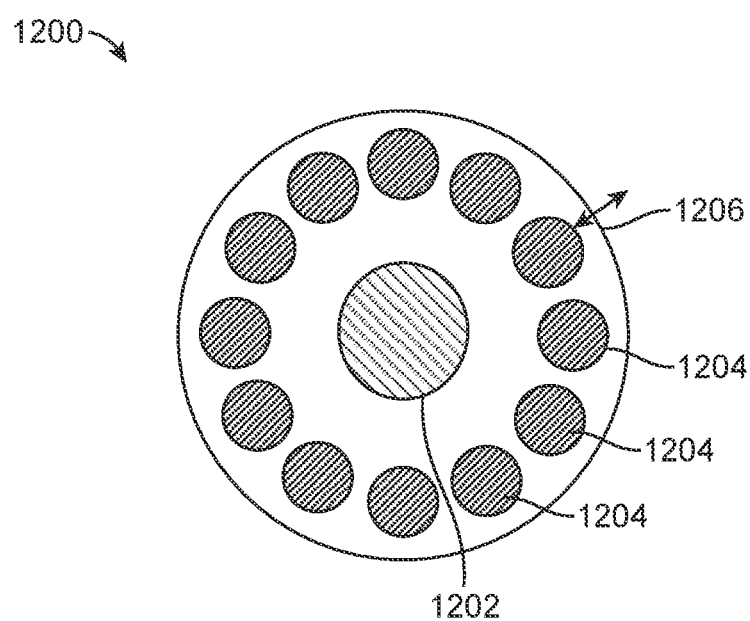
FIG. 12A illustrates a cross sectional view of an exemplary primary cylinder system, pressurized by a single ball screw actuator, according to various embodiments.

FIG. 12A illustrates a cross section view of an exemplary primary cylinder system 1200, according to various embodiments. In general, the primary cylinders may be powered by one or more actuators, such as a ball drive actuator. It should be appreciated that other various mechanisms which accomplish the same function may also or additionally be used.

In FIG. 12A, the primary cylinder system 1200 may include a ball screw shaft 1202, which may be centrally located in a circular structure, for example. The ball screw shaft 1202 may be configured to provide push and pull force on plungers in the primary cylinders 1204 positioned circumferentially around the ball screw shaft 1202. The primary cylinder system 1200 may further include a plurality of ports 1206, where at least one port 1206 corresponds with each primary cylinder 1204. The ports 1206 may be positioned proximal to the outer edge of the circular structure, such as pointing radially away from the ball screw shaft 1202. Functionally, the ports 1206 may act as a hydraulic connection for the force applied to the primary cylinders 1204 by the ball screw shaft 1202. For example, when a push force is applied by the ball screw shaft, the plungers of the primary cylinders 1204 may force hydraulic fluid to exit the primary cylinder 1204. Conversely, when a pull force is applied on the primary cylinders 1204 by the ball screw shaft 1202, a suction force may retract hydraulic fluid through the ports 1206 into the respective primary cylinder 1204. As such, the ports 1206 may each be coupled with a hydraulic line, as discussed previously, which transport the hydraulic fluid to various tilting mechanisms, resulting in the tilting of a tilting fan. For example, each of the primary cylinders 1204 may be connected to the hydraulic line via the port 1206. This hydraulic line may then, for example, be connected with a secondary cylinder for a particular tilting fan.

Figure 12B:
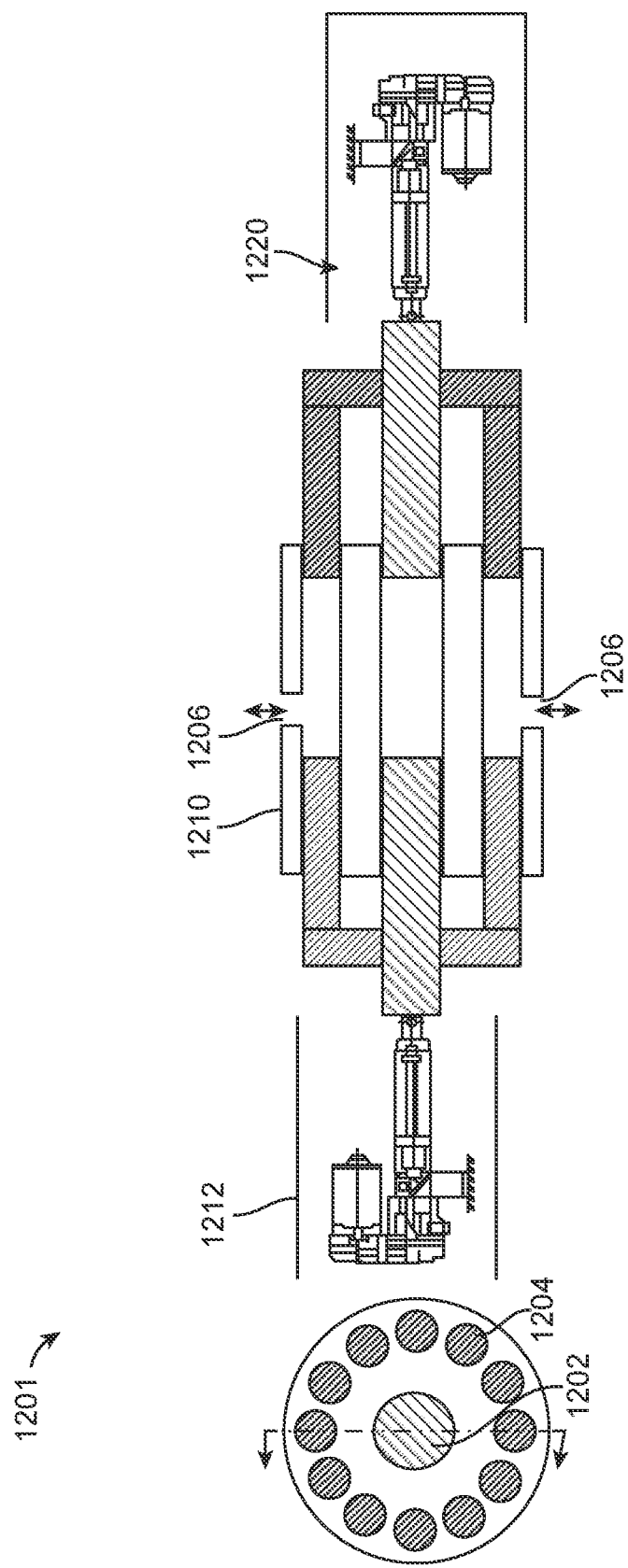
FIG. 12B illustrates a cross section view of an exemplary primary cylinder system, for incorporating two redundant pistons in a single primary cylinder, according to various embodiments.

FIG. 12B shows a cross sectional view for a primary cylinder system 1201, which incorporates two redundant pistons in a single primary cylinder 1204, according to various embodiments of the present disclosure. The primary cylinder system 1201 may include a first ball screw actuator 1210, and a second ball screw actuator 1220. The first and second ball screw actuators 1210, 1220 may, for example, be arranged facing towards each other and be concentric with the circular structure which houses the primary cylinders 1204. The first ball screw actuator 1210 may be coupled to the primary cylinder system 1201 via mechanisms 1212 on the left side, and the second ball screw actuator 1220 may be coupled to the primary cylinder system 1201 via mechanisms 1222 on the right side.

Both ball screw actuators 1210 and 1220 may be connected to the same hydraulic circuit, and thus may both act to move the same plunger of a primary cylinder 1204. According to various embodiments, each of the ball screw actuators 1210, 1220 may provide force opposite the other. For example, first ball screw actuator 1210 may push a plunger from the left side towards ports 1206, centrally located in the primary cylinder 1204. The second ball screw actuator 1220 may push a plunger from the right side towards the ports 1206. As such, each may provide an equal amount of hydraulic force through the ports 1206. However, to provide for a fail-safe configuration, each of the ball screw actuators 1210, 1220 may be configured to be moveable past the center of the primary cylinder 1204 such that if one of the ball screw actuators 1210, 1220 fails to perform the full range of motion required to generate the desired hydraulic pressure (such as in the event of failure), the other ball screw actuator 1210, 1220 may be configured to move past the center of the primary cylinder 1204 to provide the desired hydraulic force. Specifically, in the event where one of the ball screw actuators 1210, 1220 fails, the remaining ball screw actuator 1210, 1220 may move all the way to where the failing ball screw actuator 1210, 1220 stopped, thereby generating the same maximum displacement as both of the ball screw actuators 1210, 1220 performing in tandem.

The primary cylinder system 1201 illustrated in FIG. 12B is an exemplary implementation of the primary cylinder system 1200 illustrated in FIG. 12A. In the primary cylinder system 1201 of FIG. 12B, the primary cylinders 1204 may be much smaller (i.e. about half the size), compared to other systems where additional primary cylinders 1204 are provided which are totally separate. In addition, the embodiment illustrated in FIG. 12B may reduce the number of seals used in the primary cylinder system 1201, and as such may provide less components which may leak or otherwise fail.

According to various embodiments, the flight control system (or an another control system coupled to the VTOL aircraft 100) may control the tilting mechanisms to switch the positioning of the tilting fans from the forward flight position to the vertical position, as well as from the vertical position to the forward flight position. According to various embodiments, the control system (e.g. flight control system) may control the tilting fans between the two positions based on sensor data and/or flight data received from the sensors (e.g. sensor measuring air temperature, electric motor temperature, airspeed of the aircraft, etc.), computers, and other input/output devices coupled to the aircraft.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front or "back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

While the invention has been described with reference to specific embodiments, those skilled in the art with access to this disclosure will appreciate that variations and modifications are possible.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the embodiments will become apparent to those skilled in the art upon review of the disclosure. The scope of patent protection should, therefore, be determined not with reference to the above description, but instead should be determined with reference to the following claims along with their full scope or equivalent.

What is claimed is:

1. An electric aircraft comprising:
    a fuselage;
    at least one wing coupled to the fuselage;
    a plurality of tilting fans coupled to the at least one wing, wherein the plurality of tilting fans are configured to move between a vertical lift position and a forward flight position;
    a plurality of tilting mechanisms, each of the plurality of tilting mechanisms coupled with at least one tilting fan among the plurality of tilting fans; and
    a first actuator coupled to a first subset of the plurality of tilting mechanisms, wherein the first actuator tilts a first group of tilting fans coupled to the first subset of the plurality of tilting mechanisms simultaneously, wherein the first subset of the plurality of tilting mechanisms are identified among the plurality of tilting mechanisms according to a coupling scheme,
    wherein each of the first subset of the plurality of tilting mechanisms comprise a fail-safe mechanism, wherein the first group of tilting fans are configured to move to the vertical lift position upon a first actuator failure or a tilting mechanism failure.

2. The electric aircraft of claim 1, further comprising one or more support elements coupled underneath the at least one wing and spanning crosswise from the at least one wing, wherein a front tilting fan of the plurality of tilting fans and an aft tilting fan of the plurality of tilting fans are coupled to opposite ends of a first support element of the one or more support elements, wherein the front tilting fan is provided at a leading edge of the at least one wing, the aft tilting fan is provided at a trailing edge of the at least one wing.

3. The electric aircraft of claim 2, wherein a first tilting mechanism among the plurality of tilting mechanisms is coupled to the front tilting fan and the aft tilting fan, wherein the first tilting mechanism is provided within the first support element.

4. The electric aircraft of claim 2, further comprising:
    at least a second actuator coupled to a second subset of the plurality of tilting mechanisms,
    wherein the first subset of the plurality of tilting mechanisms consists of a first tilting mechanism such that the first actuator is coupled to the first tilting mechanism and provided within the first support element.

5. The electric aircraft of claim 2, wherein a first tilting mechanism among the plurality of tilting mechanisms is coupled to at least one of the front tilting fan or the aft tilting fan, wherein the first tilting mechanism includes a four bar linkage and is provided within the first support element.

6. The electric aircraft of claim 1, wherein the first subset of the plurality of tilting mechanisms further comprise a drive shaft located within the at least one wing, the drive shaft operably coupling the first actuator to the first group of tilting fans.

7. The electric aircraft of claim 1, wherein the first actuator comprises a compressor and wherein the first subset of the plurality of tilting mechanisms further comprises hydraulic lines that connect the first subset of the plurality of tilting mechanisms to the first actuator.

8. The electric aircraft of claim 7, wherein each of the first group of tilting fans comprises a respective tilting mechanism of the first subset of the plurality of tilting mechanisms.

9. The electric aircraft of claim 1, wherein the first group of tilting fans consists of a plurality of front tilting fans provided on a leading edge of the at least one wing.

10. The electric aircraft of claim 9, wherein the plurality of tilting fans further comprises a plurality of aft tilting fans provided on a trailing edge of the at least one wing, wherein the plurality of aft tilting fans are configured to passively move from the vertical lift position to the forward flight position, wherein the plurality of aft tilting fans are mechanically independent from one another.

11. The electric aircraft of claim 10, further comprising:
    a support element coupled to the at least one wing;
    a passive tilting mechanism coupled to an aft portion of the support element, the passive tilting mechanism further comprising:
        an arm rotatably coupling a given aft tilting fan of the plurality of aft tilting fans to the support element;
        a spring element spanning the given aft tilting fan and the support element, wherein the spring element is configured to cause the arm to rotate when horizontal thrust exceeds a threshold thrust value; and
        at least one travel limiting stop configured to limit a rotation angle of the arm.

12. The electric aircraft of claim 11, wherein the passive tilting mechanism is configured to reduce an aerodynamic drag in the forward flight position by causing a plurality of blades of the given aft tilting fan to fold together while in forward flight position.

13. The electric aircraft of claim 1, wherein the coupling scheme is diametrically symmetric with respect to a center of gravity of the electric aircraft.

14. The electric aircraft of claim 13, wherein the coupling scheme includes all of the plurality of tilting mechanisms, the first group of tilting fans comprise all of the plurality of tilting fans, and such that the first actuator tilts all of the plurality of tilting fans.

15. The electric aircraft of claim 1, wherein the first subset of the plurality of tilting mechanisms comprise a plurality of primary cylinders operably coupled with the first actuator, wherein each one of the plurality of primary cylinders is operably coupled to a secondary cylinder of a plurality of secondary cylinders that is operatively coupled to a given tilting fan of the first group of tilting fans, wherein the plurality of secondary cylinders are configured to receive hydraulic pressure from the plurality of primary cylinders.

16. The electric aircraft of claim 15, further comprising a second actuator operably coupled with the plurality of secondary cylinders in parallel with the first actuator, such that a given actuator of the first and second actuators each tilt the given tilting fan of the first group of tilting fans.

17. The electric aircraft of claim 1, further comprising:
a second group of tilting fans among the plurality of tilting fans; and
a second subset of the plurality of tilting mechanisms, each of the second subset of the plurality of tilting mechanisms coupled with at least one tilting fan of the second group of tilting fans.

18. The electric aircraft of claim 17, wherein the first actuator tilts the first group of tilting fans and the second group of tilting fans.

19. The electric aircraft of claim 17, further comprising:
a second actuator coupled to the second subset of the plurality of tilting mechanisms, wherein the second actuator tilts the second group of tilting fans coupled to the second subset of the plurality of tilting mechanisms simultaneously.

20. An electric aircraft comprising:
a fuselage;
at least one wing coupled to the fuselage;
a plurality of tilting fans coupled to the at least one wing, wherein the plurality of tilting fans are configured to move between a vertical lift position and a forward flight position;
a plurality of tilting mechanisms, each of the plurality of tilting mechanisms coupled with at least one tilting fan among the plurality of tilting fans; and
a first actuator coupled to a first subset of the plurality of tilting mechanisms, wherein the first actuator tilts a first group of tilting fans coupled to the first subset of the plurality of tilting mechanisms simultaneously, wherein the first subset of the plurality of tilting mechanisms are identified among the plurality of tilting mechanisms according to a coupling scheme, wherein the first subset of the plurality of tilting mechanisms comprise a plurality of primary cylinders operably coupled with the first actuator, wherein each one of the plurality of primary cylinders is operably coupled to a secondary cylinder of a plurality of secondary cylinders that is operatively coupled to a given tilting fan of the first group of tilting fans, wherein the plurality of secondary cylinders are configured to receive hydraulic pressure from the plurality of primary cylinders.

21. An electric aircraft comprising:
a fuselage;
at least one wing coupled to the fuselage;
a plurality of tilting fans coupled to the at least one wing, wherein the plurality of tilting fans are configured to move between a vertical lift position and a forward flight position;
a plurality of tilting mechanisms, each of the plurality of tilting mechanisms coupled with at least one tilting fan among the plurality of tilting fans; and
a first actuator coupled to a first subset of the plurality of tilting mechanisms, wherein the first actuator tilts a first group of tilting fans coupled to the first subset of the plurality of tilting mechanisms simultaneously, wherein the first subset of the plurality of tilting mechanisms are identified among the plurality of tilting mechanisms according to a coupling scheme, wherein the first group of tilting fans consists of a plurality of front tilting fans provided on a leading edge of the at least one wing, wherein the plurality of tilting fans comprises a plurality of aft tilting fans provided on a trailing edge of the at least one wing, wherein the plurality of aft tilting fans are configured to passively move from the vertical lift position to the forward flight position, wherein the plurality of aft tilting fans are mechanically independent from one another.

* * * * *